United States Patent
Loverink

(10) Patent No.: US 12,350,781 B1
(45) Date of Patent: Jul. 8, 2025

(54) PORTABLE ROUTING SYSTEM AND METHOD OF USE

(71) Applicant: Woodpeckers, LLC, Strongsville, OH (US)

(72) Inventor: Derwin Loverink, Norton, OH (US)

(73) Assignee: Woodpeckers, LLC, Strongsville, OH (US)

( * ) Notice: Subject to any disclaimer, the term of this patent is extended or adjusted under 35 U.S.C. 154(b) by 0 days.

(21) Appl. No.: 18/740,694

(22) Filed: Jun. 12, 2024

(51) Int. Cl.
*B23Q 9/00* (2006.01)
*B27C 5/10* (2006.01)

(52) U.S. Cl.
CPC .............. *B23Q 9/0028* (2013.01); *B27C 5/10* (2013.01)

(58) Field of Classification Search
CPC .. B23Q 9/0014; B23Q 9/0028; B23Q 9/0064; B23Q 9/0071; B23Q 9/0078; B27C 5/02; B27C 5/10
See application file for complete search history.

(56) References Cited

U.S. PATENT DOCUMENTS

| | | | |
|---|---|---|---|
| 4,294,297 A * | 10/1981 | Kieffer | B27C 5/10 144/371 |
| 4,555,099 A | 11/1985 | Hilton | |
| 5,452,751 A * | 9/1995 | Engler, III | B23Q 9/0021 144/144.1 |
| 5,694,994 A * | 12/1997 | Engler, III | B27C 9/02 409/230 |
| 5,725,038 A | 3/1998 | Tucker et al. | |
| 6,382,276 B1 * | 5/2002 | Daniels | B27C 5/02 144/1.1 |
| 6,520,227 B2 * | 2/2003 | Mc Farlin, Jr. | B27C 5/10 144/329 |
| 7,418,907 B2 | 9/2008 | Haimoff | |
| 8,628,280 B2 * | 1/2014 | Ceroll | B27C 5/02 144/136.95 |
| 9,221,188 B1 | 12/2015 | Wisen | |
| 11,780,111 B1 | 10/2023 | Eckes | |
| 2011/0222981 A1 | 9/2011 | Derler et al. | |
| 2013/0277902 A1 | 10/2013 | Lin | |
| 2015/0343607 A1 | 12/2015 | Wang | |
| 2018/0099404 A1 | 4/2018 | Wang | |
| 2021/0299768 A1 | 9/2021 | Wang | |
| 2022/0395949 A1 | 12/2022 | Urig | |

* cited by examiner

*Primary Examiner* — Matthew Katcoff
(74) *Attorney, Agent, or Firm* — Sand, Sebolt & Wernow Co., LPA

(57) ABSTRACT

A portable router table that includes a top surface of a bench that is adapted to support at least one workpiece. The portable router table also includes a bottom surface of the bench that is spaced apart from the top surface. The portable router table also includes a router base that is removably engageable with the bench and is adapted to support a router. When the router base is provided in a first cutting orientation, the router base is engaged with the bench. When the router base is provided in a second cutting orientation, the router base is spaced apart and remote from the bench.

11 Claims, 27 Drawing Sheets

PORTABLE ROUTING SYSTEM AND METHOD OF USE

TECHNICAL FIELD

This disclosure is directed to a portable router table for woodworking operations.

BACKGROUND ART

Portable routers and similar portable cutting devices are versatile woodworking tools that are commonly used to cut various types of workpiece or stock. Generally, portable routers are used to cut various types of features and/or designs into a workpiece as dictated by the woodworking project based on a router bit equipped to the router. While a woodworker may use a portable router to cut various types of features and designs into a workpiece, it is difficult and demanding to cut precisely and accurately depending on the size, shape, or configuration of the workpiece.

To address these difficulties and problems, a woodworker may select a router table or similar apparatus to help stabilize and guide the portable router during a cutting operation. While such assisting apparatuses are provided in the market and useful in controlling a portable router, woodworkers that use such apparatuses may have to succumb to a more compact woodworking environment or purchase additional apparatuses to prevent such compact environment. In one example, portable router tables require a fair amount of workspace in a woodworking environment given the footprint of such router tables. While portable router tables are also commonly used in woodworking projects, such portable router tables must rest completely on workbenches or similar support structures due to the structural configuration of common portable router tables. As such, woodworker must sacrifice a portion of their workbench or table to accommodate such apparatus or must purchase additional devices to use such router table.

In another example, woodworkers must have more than one router on hand when using a conventional router table. In these operations, the portable router that is engaged with the router table is normally disposed below the table, secured directly to the bench of the router table, and placed at a desired cutting depth. With this configuration, woodworkers have at least another router on hand when cutting operations cannot be performed by the portable router that is equipped to the portable table; such instances occur when the workpiece or stock is too large or cumbersome for the portable table. As such, woodworkers may be required to purchase various routers or similar cutting tools in order to avoid an expenditure of more time and effort when the woodworker is performing various cutting operations.

SUMMARY OF THE INVENTION

In one aspect, an exemplary embodiment of the present disclosure may provide a portable router table. The portable router table includes a top surface of a bench that is adapted to support at least one workpiece, a bottom surface of the bench that is spaced apart from the top surface, and at least one bottom slot defined in the bottom surface of the bench; wherein the bench is adapted to engage with a bench clamp inside of the at least one bottom slot for clamping the portable router table with a support structure. This exemplary embodiment or another exemplary embodiment may further include that the bench is cantilevered from the support structure and the bottom surface of the bench is engaged with the support structure. This exemplary embodiment or another exemplary embodiment may further include that the bench further comprises: a front end; a rear end opposite to the front end; wherein the at least bottom slot is accessible at one of the front end and the rear end. This exemplary embodiment or another exemplary embodiment may further include that the at least one bottom slot comprises: a first bottom slot defined in the bottom surface of the bench; and a second bottom slot defined in the bottom surface of the bench and is opposite to the first bottom slot; wherein the bench is adapted to engage with the bench clamp inside of the first bottom slot for clamping the portable router table with the support structure at a first side of the bench; and wherein the bench is adapted to engage with a second bench clamp inside of the second bottom slot for clamping the portable router table with the support structure at a second side of the bench. This exemplary embodiment or another exemplary embodiment may further include a pair of legs operably engaging with the bench at the bottom surface; wherein each leg of the pair of legs is moveable between a stored position and an operating position. This exemplary embodiment or another exemplary embodiment may further include that each leg of the pair of legs comprises: a first end pivotably engaged with the bench at the bottom surface; a second end opposite to the first end and adapted to engage with the support structure; and a foot extending outwardly from the second end; wherein the bench clamp is adapted to clamp the foot with the support structure to maintain the portable router table with the support structure. This exemplary embodiment or another exemplary embodiment may further include a router base removably engaged with the bench between a first cutting orientation and a second cutting orientation; wherein when the router base is in the first cutting orientation, the router base is engaged with the bench; and wherein when the router base is in the second cutting orientation, the router base is spaced apart and remote from the bench. This exemplary embodiment or another exemplary embodiment may further include a seating recess defined in the bench and is accessible from the top surface and the bottom surface; wherein the router base is seated inside of the seating recess when in the first cutting orientation. This exemplary embodiment or another exemplary embodiment may further include an internal lateral wall; and an internal base wall positioned below the internal lateral wall; wherein the seating recess is collectively defined by the internal lateral wall and the internal base wall; and wherein the router base is held by the internal lateral wall and the internal base wall inside of the seating recess when in the first cutting orientation. This exemplary embodiment or another exemplary embodiment may further include a front opening defined in the front end of the bench; wherein the front opening provides access to the seating recess and a handle of the router base when the router base in provided in the first cutting orientation. This exemplary embodiment or another exemplary embodiment may further include a retaining member operably engaged with the bench; wherein the retaining member is partially seated inside of the seating recess to frictionally fit the router base with the bench. This exemplary embodiment or another exemplary embodiment may further include a cavity defined by the internal lateral wall and the internal base wall and is in communication with the seating recess; wherein the retaining member is partially seated inside of the cavity. This exemplary embodiment or another exemplary embodiment may further include that the retaining member is formed of a resilient material. This exemplary embodiment or another exemplary embodiment may further include at least one top slot defined in the top surface of the bench; wherein the bench is adapted to engage with at least one clamp of a fence inside of the at least one top slot for clamping the fence with the bench.

In another aspect, an exemplary embodiment of the present disclosure may provide a method of cutting a workpiece on a portable router table. The method comprises steps of: engaging a bench clamp into a slot defined in a bench of the portable router table; engaging the bench clamp and a first end of the bench, collectively, with a support structure; securing the bench clamp with the bench and the support structure; suspending a second end of the bench from the support structure, wherein the second end of the bench is opposite to the first end of the bench; and routing the workpiece on the portable router table.

This exemplary embodiment or another exemplary embodiment may further include steps of resting a portion of a bottom surface of the bench on the support structure; and positioning the bench above the support structure. This exemplary embodiment or another exemplary embodiment may further include steps of resting a portion of a top surface of the bench on the support structure; and positioning the bench below the support structure. This exemplary embodiment or another exemplary embodiment may further include steps of engaging a second bench clamp into a second slot defined in the bench, wherein the second slot is transversely opposite to the slot; engaging the second bench clamp and the first end of the bench, collectively, with the support structure; and securing the second bench clamp with the bench and the support structure. This exemplary embodiment or another exemplary embodiment may further include steps of disengaging the bench clamp from the bench and the support structure; engaging the bench clamp to a foot of a leg of the portable router table; engaging the bench clamp and the foot, collectively, with the support structure; and securing the bench clamp with the foot and the support structure. This exemplary embodiment or another exemplary embodiment may further include a step of positioning a router base of the portable router table at a first cutting orientation or at a second cutting orientation relative to the bench; wherein when the router base is in the first cutting orientation, the router base is engaged with the bench; and wherein when the router base is in the second cutting orientation, the router base is spaced apart and remote from the bench.

In another aspect, and exemplary embodiment of the present disclosure may provide a portable router table. The portable router table includes a top surface of a bench that is adapted to support at least one workpiece; a bottom surface of the bench that is spaced apart from the top surface; and a router base removably engageable with the bench and is adapted to support a router; wherein when the router base is provided in a first cutting orientation, the router base is engaged with the bench; and wherein when the router base is provided in a second cutting orientation, the router base is spaced apart and remote from the bench.

This exemplary embodiment or another exemplary embodiment may further include that when the router base is provided in the first cutting orientation, the router base and the top surface of the bench are even with one another to form a continuous surface; and wherein when the router base is provided in the second cutting orientation, the router base and the top surface of the bench are free from forming a continuous surface. This exemplary embodiment or another exemplary embodiment may further include that the router base comprises: a plate removably engaged with the bench and being adapted to support the router; and a handle operably engaged with the plate. This exemplary embodiment or another exemplary embodiment may further include that the plate comprises: a first surface adapted to rest on the at least one workpiece; a second surface opposite to the first surface and is adapted to contact the router and the handle; and a central opening defined in the plate and extending between the first surface and the second surface; wherein a router bit of the router is adapted to pass through the central opening. This exemplary embodiment or another exemplary embodiment may further include that when the router base is provided in the first cutting orientation, the first surface of the plate and the top surface of the bench are even with one another to form a continuous surface; and wherein when the router base is provided in the first cutting orientation, the second surface rests inside of the bench. This exemplary embodiment or another exemplary embodiment may further include that the plate further comprises: at least two sets of apertures defined in the plate and being spaced apart from the central opening; wherein the router is adapted to engage with the router base at a first set of apertures of the at least two sets of apertures; and wherein a second router is adapted to engage with the router base at a second set of apertures of the at least two sets of apertures. This exemplary embodiment or another exemplary embodiment may further include that when the router base is provided in the first cutting orientation, the handle of the router base extends downwardly and accessible below the bottom surface of the bench. This exemplary embodiment or another exemplary embodiment may further include a seating recess defined in the bench and is accessible from the top surface and the bottom surface; wherein the router base is seated inside of the seating recess when in the first cutting orientation. This exemplary embodiment or another exemplary embodiment may further include an internal lateral wall; an internal base wall positioned below the internal lateral wall; and wherein the seating recess is collectively defined by the internal lateral wall and the internal base wall; wherein the router base is held by the internal lateral wall and the internal base wall inside of the seating recess when in the first cutting orientation. This exemplary embodiment or another exemplary embodiment may further include a front opening defined in the bench; wherein the front opening provides access to the seating recess and a handle of the router base when the router base is provided in the first cutting orientation. This exemplary embodiment or another exemplary embodiment may further include a retaining member operably engaged with the bench; wherein the retaining member is partially seated inside of the seating recess to frictionally fit the router base with the bench. This exemplary embodiment or another exemplary embodiment may further include a cavity defined by the internal lateral wall and the internal base wall and is in communication with the seating recess; wherein the retaining member is partially seated inside of the cavity. This exemplary embodiment or another exemplary embodiment may further include that the retaining member is formed of a resilient material. This exemplary embodiment or another exemplary embodiment may further include that when the router base is provided in the first cutting orientation, the router bit extends upwardly from the top surface of the bench; and wherein when the router base is provided in the first cutting orientation, the motor is positioned below the base and the at least one workpiece. This exemplary embodiment or another exemplary embodiment may further include that when the router base is provided in the first cutting orientation, a motor of the router is positioned above the at least one workpiece and remote from the bench.

In another aspect, an exemplary embodiment of the present disclosure may provide a method of cutting a workpiece. The method comprises steps of: engaging a router with a router base of a portable router table; positioning the router base at a first cutting orientation or at a second cutting orientation relative to a bench of the portable router table of the portable router table; supporting a workpiece along a first surface of the router base only or along the first surface of the router and the bench of the portable router table, collectively; and cutting a workpiece with the router.

This exemplary embodiment or another exemplary embodiment may further include steps of engaging the router base with the bench of the portable router table when the router base is in the first cutting orientation; and supporting the workpiece by the router base and the bench of the portable router table when the router base is in the first cutting orientation. This exemplary embodiment or another exemplary embodiment may further include steps of separating the router base from the bench of the portable router table when the router base is in the second cutting orientation; and supporting the workpiece by the router base when the router base is in the second cutting orientation. This exemplary embodiment or another exemplary embodiment may further include steps of accessing a handle of the router base through a front opening defined in the bench of the router base; and removing the router base from the bench, by the handle, from the first cutting orientation to the second cutting orientation. This exemplary embodiment or another exemplary embodiment may further include a step of seating the router base inside of a seating recess defined in the bench when the router base is in the first cutting orientation. This exemplary embodiment or another exemplary embodiment may further include a step of securing the router base with a retaining member of the portable router table in the first cutting orientation. This exemplary embodiment or another exemplary embodiment may further include steps of disengaging the router from the router base, wherein the router is arranged with a first set of apertures defined in the router base; aligning a second router with a second set of apertures defined in the router base, wherein the second router is different than the router, and wherein the second set of apertures is different than the first set of apertures; and engaging the second router with the router base.

In another aspect, an exemplary embodiment of the present disclosure may provide a portable router table. The portable router table also includes a bench; a fence operably engageable with the bench and configured to contact a workpiece; and a micro-adjuster operably engageable with the bench and the fence; wherein the micro-adjuster is configured to pivot the fence relative to a router bit of a router that is engaged with the bench.

This exemplary embodiment or another exemplary embodiment may further include that when the fence is pivoted in a first pivot direction relative to the router bit, the fence is moving towards the router bit; and wherein when the fence is pivoted in a second pivot direction relative to the router bit, the fence is moving away from the router bit. This exemplary embodiment or another exemplary embodiment may further include that the fence is positioned between the bench and the micro-adjuster. This exemplary embodiment or another exemplary embodiment may further include a frame of the fence; a base plate of the micro-adjuster; a pivot mechanism of the micro-adjuster pivotably engaging the frame with the bench and the base plate; and an adjustment mechanism of the micro-adjuster moving the frame relative to the base plate. This exemplary embodiment or another exemplary embodiment may further include a first end of the fence; a second end of the fence opposite to the first end; and a measurement indicia of the micro-adjuster defined on the base plate; wherein the second end of the fence aligns with the measurement indicia to set a desired distance between the fence and the router bit. This exemplary embodiment or another exemplary embodiment may further include a starting marker that positions the fence at a first distance from the router bit; a first terminal marker that positions the fence at a second distance from the router bit; and a second terminal marker that positions the fence at a third distance from the router bit. This exemplary embodiment or another exemplary embodiment may further include that the third distance is greater than the first and second distances; and wherein the first distance is greater than the first distance. This exemplary embodiment or another exemplary embodiment may further include that the adjustment mechanism comprises: a post operably engaged with the frame; a shaft rotatably engaged with the post and the base plate; and an adjustment knob operably engaged with the shaft; wherein the adjustment knob is configured to linearly move the shaft and the post to pivot the frame of the fence. This exemplary embodiment or another exemplary embodiment may further include that when the adjustment knob rotates in a first rotational direction, the shaft and the post move in a first linear direction to pivot the fence in a first pivot direction towards the router bit; and wherein when the adjustment knob rotates in a second rotational direction, the shaft and the post move in a second linear direction to pivot the fence in a second pivot direction away from the router bit. This exemplary embodiment or another exemplary embodiment may further include that the adjustment mechanism further comprises: a first end of the adjustment knob facing the post; a second end of the adjustment knob opposite to the first end and facing a vertical wall of the base plate; an extension of the adjustment knob extending from the second end; and a washer positioned between the adjustment knob and the vertical wall and configured to receive the extension inside a countersunk opening defined by the washer. This exemplary embodiment or another exemplary embodiment may further include that the extension is defined by a first shape and the countersunk opening of the coned washer is defined by a second shape that is complimentary with the first shape. This exemplary embodiment or another exemplary embodiment may further include that the adjustment mechanism further comprises: a spring positioned circumferentially about a portion of the shaft; and a lock nut operably engaged with the shaft wherein the spring is positioned between a vertical wall of the base plate and the lock nut to bias the shaft to a starting marker of the micro-adjuster. This exemplary embodiment or another exemplary embodiment may further include that the adjustment mechanism further comprises: a locking mechanism releasably engaged with the frame of the fence with the base plate of the micro-adjuster.

In another aspect, an exemplary embodiment of the present disclosure may provide a method for adjusting a workpiece relative to a router. The method includes steps of: engaging a micro-adjuster of a portable router table to a bench of the portable router table; engaging a fence of the portable router table with the micro-adjuster and the bench; resting the workpiece along the bench and the fence; and pivoting the fence, by the micro-adjuster, in a first pivot direction or in a second pivot direction relative to a router bit until the workpiece is at a desired distance from the router bit.

This exemplary embodiment or another exemplary embodiment may further include steps of engaging a post of the micro-adjuster with the fence; engaging a shaft of the micro-adjuster with the fence and a base plate of the micro-adjuster; engaging an adjustment knob of the micro-adjuster with the shaft and the base plate. This exemplary embodiment or another exemplary embodiment may further include that the step of pivoting the fence further comprises: rotating an adjustment knob of the micro-adjuster a first rotational direction or in a second rotational direction; moving the shaft in a first linear direction or in a second linear direction; moving the post and the fence, collectively, in the first pivot direction towards the router bit or in the second pivot direction away from the router bit. This exemplary embodiment or another exemplary embodiment may further include a step of positioning the micro-adjuster between the fence and the bench. This exemplary embodiment or another exemplary embodiment may further include steps of aligning a rear end of a frame of the fence with a starting marker of a measurement indicia that is on a base plate of the micro-adjuster; and defining the fence at a first distance measured relative to the router bit. This exemplary embodiment or another exemplary embodiment may further include steps of aligning the rear end of the frame with a first terminal marker of the measurement indicia; defining the fence at a second distance measured relative to the router bit that is less than the first distance. This exemplary embodiment or another exemplary embodiment may further include steps of aligning the rear end of the frame with a second terminal marker of the measurement indicia; and defining the fence at a third distance measured relative to the router bit that is greater than the first distance and the second distance.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
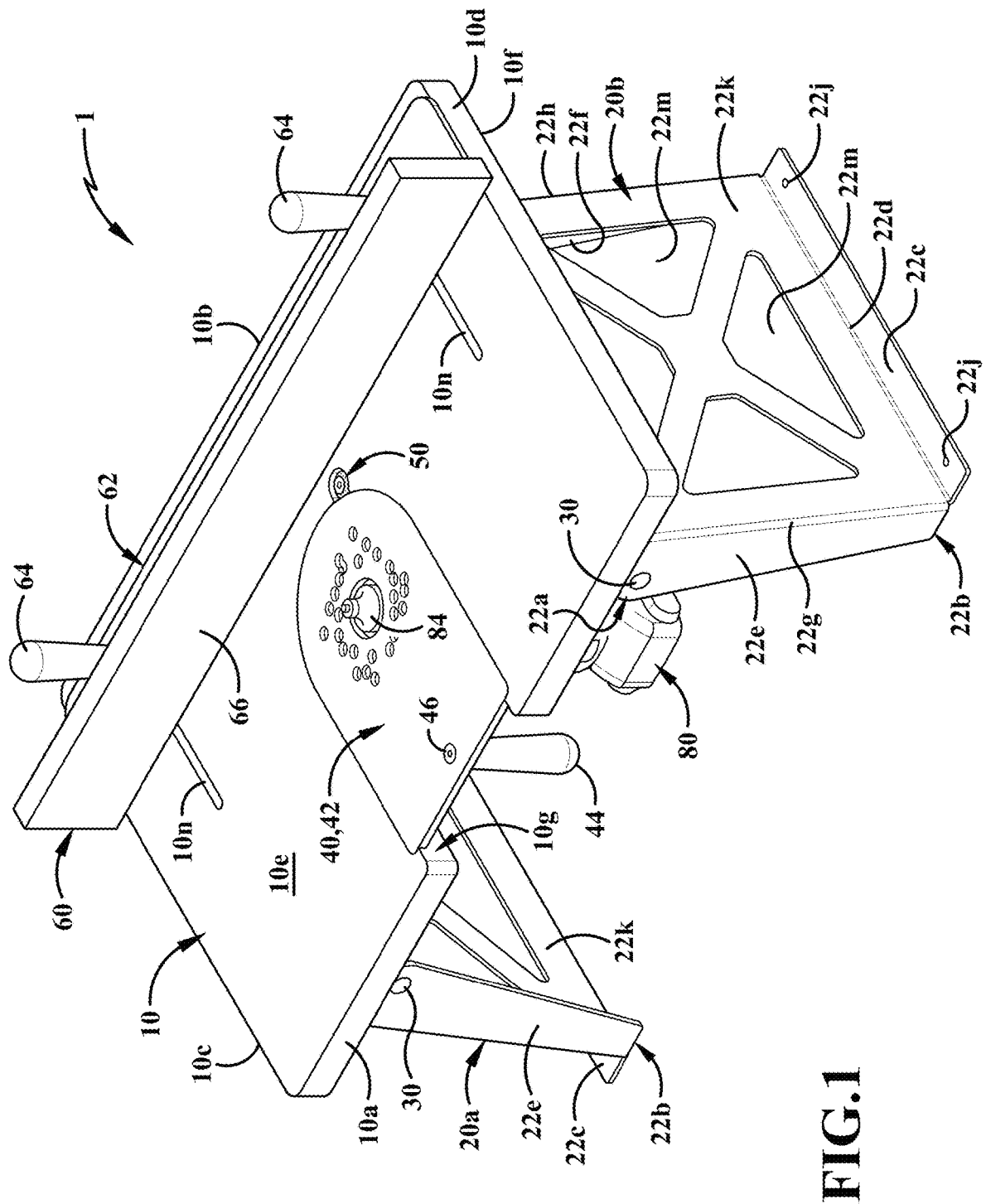
FIG. 1 (FIG. 1) is a front, top, first side isometric perspective view of a portable router table and a removable router base in accordance with one aspect of the present disclosure, wherein the removable router base is in the first cutting orientation.
Figure 2:
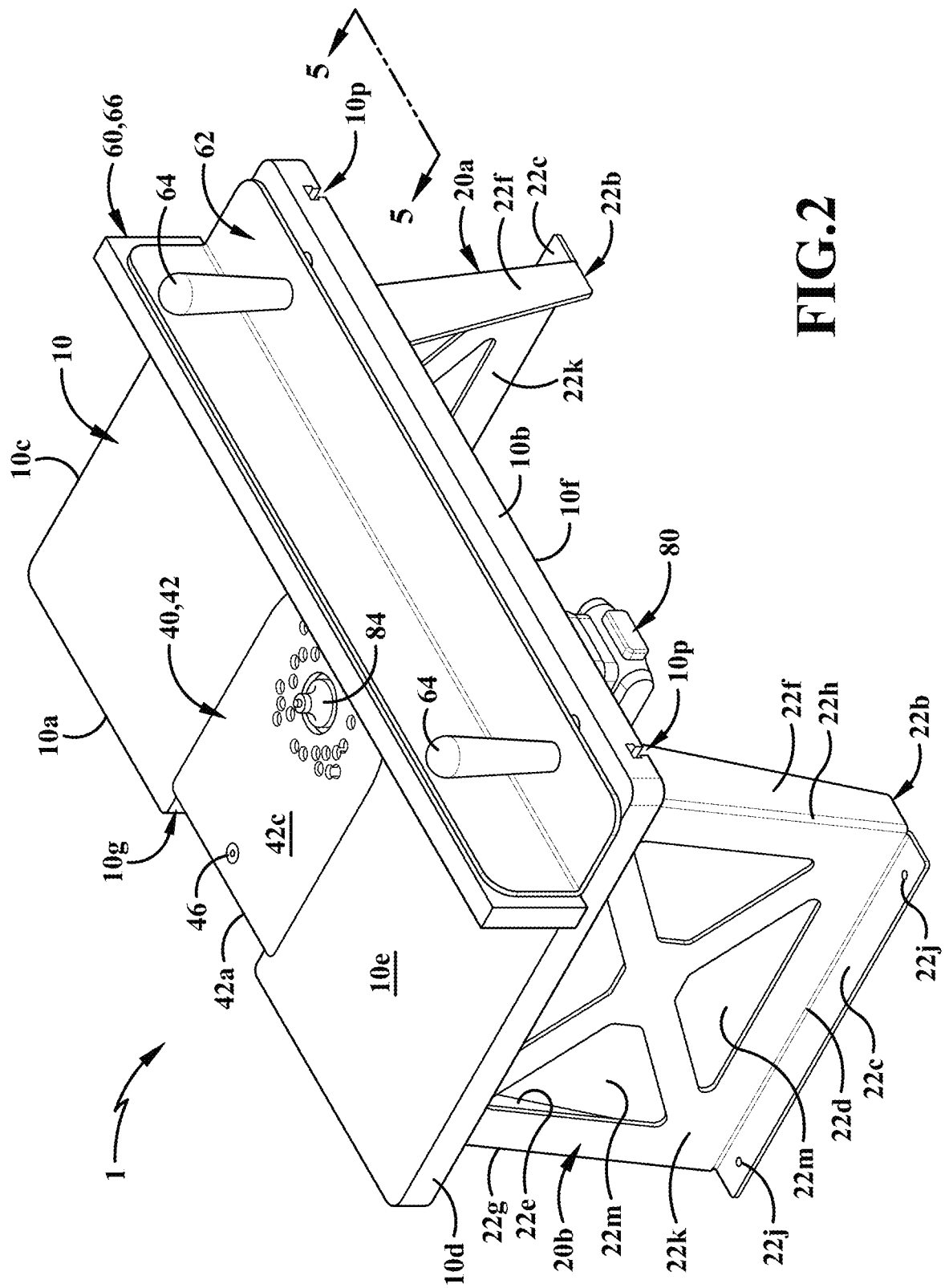
FIG. 2 (FIG. 2) is a rear, top, first side isometric perspective view of the portable router table and the removable router base in accordance with one aspect of the present disclosure.

FIGS. 1-2 illustrates a portable router table 1 that assists a router in routing and/or cutting various types of workpiece. As discussed in greater detail below, portable router table 1 is selectively operably engageable with a support structure in a first cutting configuration and in a second cutting configuration for assisting in routing and/or cutting various types of workpiece. Such components of the portable router table 1 are now discussed in greater detail below.

Portable router table 1 includes a bench 10. As best seen in FIG. 1, bench 10 includes a first or front end 10*a*, a second or rear end 10*b* opposite to the first end 10*a*, and a transverse axis defined between the first end 10*a* and the second end 10*b*. Bench 10 also includes a first side 10*c*, a second side 10*d* opposite to the first side 10*c*, and a longitudinal axis defined between the first side 10*c* and the second side 10*d*. Bench 10 also includes a top surface 10*e*, a bottom surface 10*f* opposite to the top surface 10*e*, and a vertical axis defined between the top surface 10*e* and the bottom surface 10*f*. In the present disclosure, bench 10 also defines a two-dimensional rectangular shape when view from a top perspective view (see FIGS. 1-2). In other exemplary embodiments, bench 10 may define any suitable two-dimensional shape when viewed from a top plan view as dictated by the implementation of bench 10.

Figure 7:
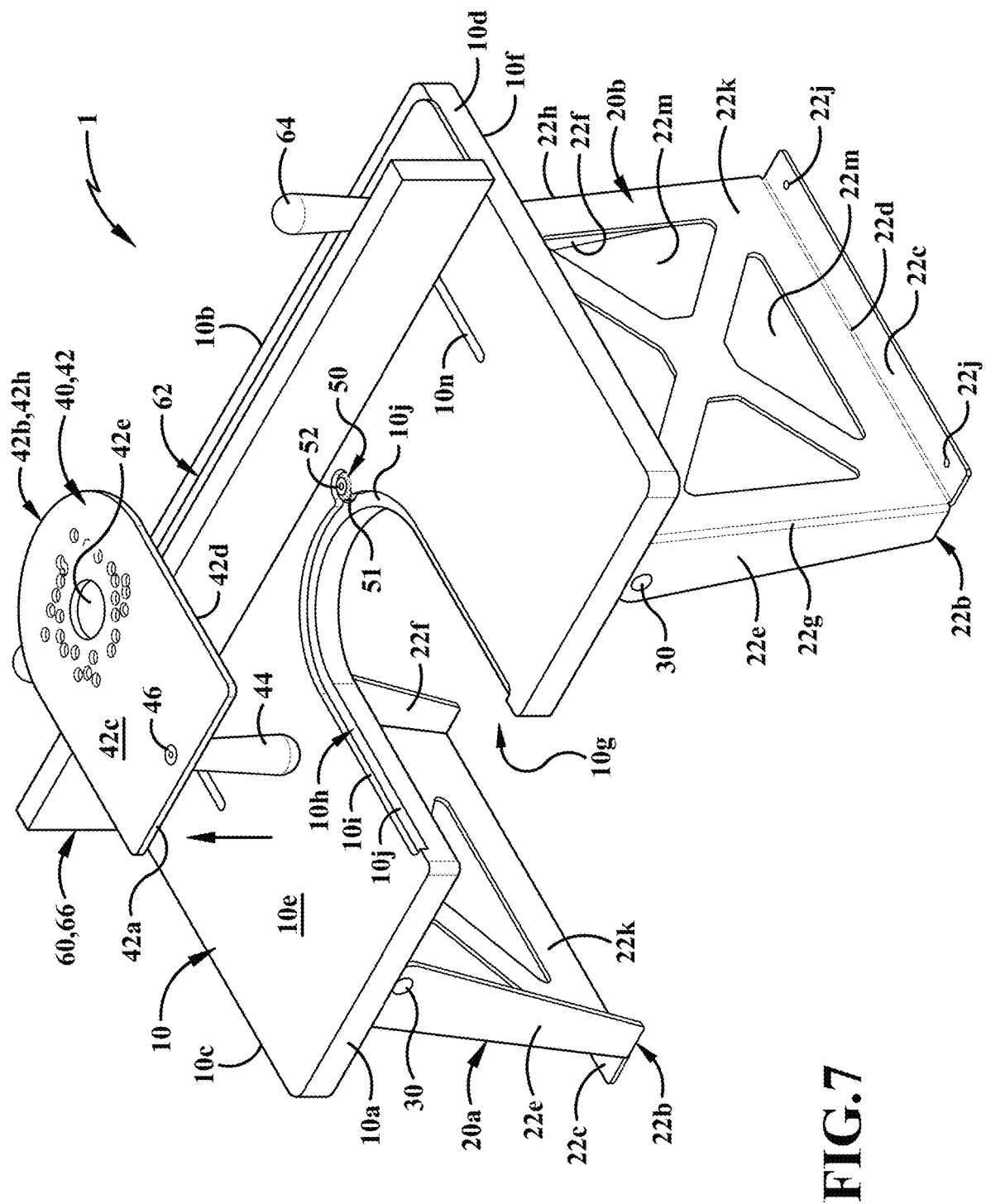
FIG. 7 (FIG. 7) is an operational view of the removable router base being removed from the portable router table at the first cutting orientation.

Still referring to bench 10, bench 10 also defines a front opening 10*g*. As best seen in FIGS. 1 and 7, front opening 10*g* extends transversely into the bench 10 from the first end 10*a* towards the second end 10*b*. The top surface 10*e* and the bottom surface 10*f* of the bench 10 are also in communication with one another at the front opening 10*g*. In the present disclosure, the front opening 10*g* defines an arcuate and/or curvilinear shape when viewed from a top plan view (see FIG. 3). As such, a portion of the first end 10*a* matches the arcuate and/or curvilinear shape in order to define the front opening 10*g* in the bench 10. In other exemplary embodiments, front opening 10*g* defined in bench 10 may have any suitable shape as dictated by the implementation of bench 10. Such use and purpose of front opening 10*g* is discussed in greater detail below.

Still referring to bench 10, bench 10 also defines a seating recess 10*h*. As best seen in FIG. 7, seating recess 10*h* is collectively defined by an internal lateral wall 10*i* that extends vertically downward into the front opening 10*g* from the top surface 10*e* towards the bottom surface 10*f* and terminates at an internal base wall 10*j*. Such use and purpose of the seating recess 10*h* is discussed in greater detail below.

Bench 10 also defines a cavity 10*k* that extends vertically downward into the bench 10 from the top surface 10*e*. Particularly, cavity 10*k* is defined by a second internal lateral wall 10*i*' and terminates at a second internal base wall 10*j*'. In the present disclosure, the cavity 10*k* is also in communication with the seating recess 10*h*; such communication between the seating recess 10*h* and the cavity 10*k* is discussed in greater detail below. It should be noted that second internal lateral wall 10*i*' and second internal base wall 10*j*' are continuous with the internal lateral wall 10*i* and the internal base wall 10*j*.

Figure 4:
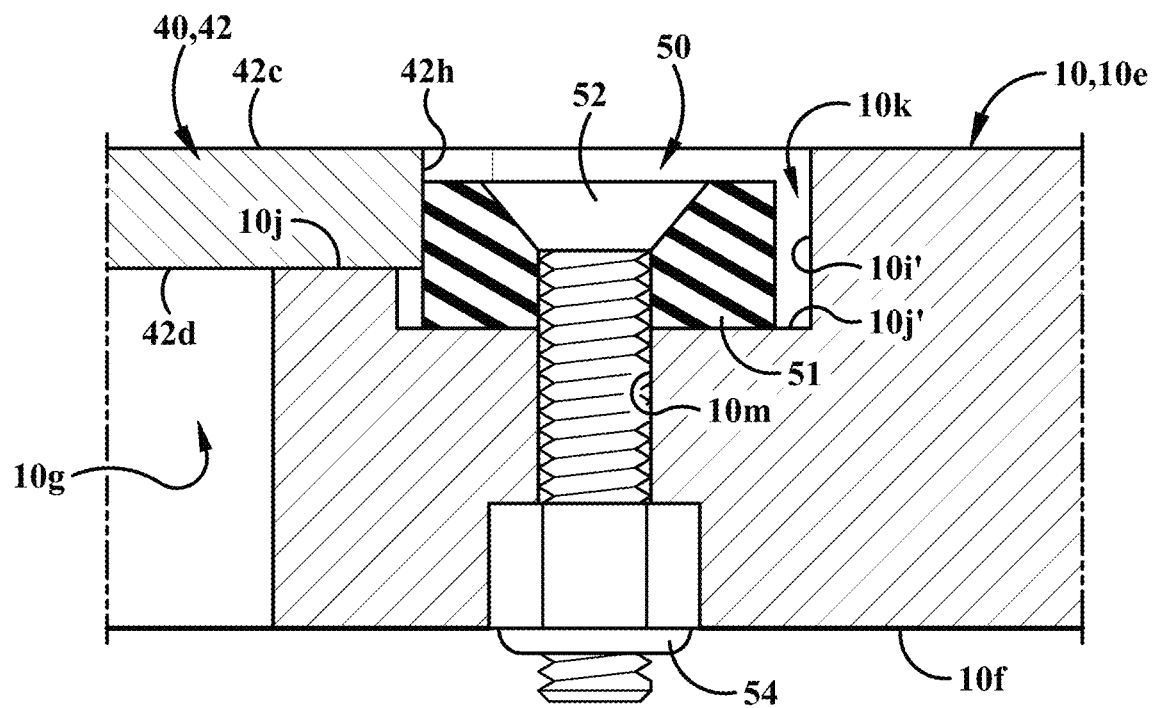
FIG. 4 (FIG. 4) is a sectional view of the portable router base taken in the direction of line 4-4 shown in FIG. 3.

Bench 10 also defines a through-hole 10*m* that extends vertically between the bottom surface 10*f* and the internal base wall 10*j* (see FIG. 4). In the present disclosure, the bottom surface 10*f* and the internal base wall 10*j* are in communication with one another at the through-hole 10*m*. Such use and purpose of through-hole 10*m* is discussed in greater detail below.

Still referring to bench 10, bench 10 defines a first or top pair of slots 10*n*. As best seen in FIGS. 1-2, each slot of the top pair of slots 10*n* is defined in the top surface 10*e* of bench 10 between the front opening 10*g* and a respective side 10*c*, 10*d* of bench 10. Each slot of the top pair of slots 10*n* is also defined proximate to the second end 10*b* of the bench 10 such that each slot of the top pair of slots 10*n* extends transversely from the second end 10*b* towards the first end 10*a*. Each slot of the top pair of slots 10*n* is spaced apart from and/or is remote from the first end 10*a* of the bench 10. As discussed in greater detail below, bench 10 is configured to receive and engage with a fence discussed herein at one or both of the slots of the top pair of slots 10*n* for assistance in routing or cutting various types of workpieces.

Still referring to bench 10, bench 10 defines a second or bottom pair of slots 10*p*. As best seen in FIGS. 1-2, each slot of the bottom pair of slots 10*p* is defined in the bottom surface 10*f* of bench 10 between the front opening 10*g* and a respective side 10*c*, 10*d* of bench 10. Each slot of the bottom pair of slots 10*p* is also defined proximate to the second end 10*b* of the bench 10 such that each slot of the bottom pair of slots 10*p* extends transversely from the second end 10*b* towards the first end 10*a*. As such, each slot of the bottom pair of slots 10*p* is spaced apart from and/or is remote from the first end 10*a* of the bench 10. As discussed in greater detail below, clamps or similar attachment devices may engage with the bench 10 at one or both of the slots of the bottom pair of slots 10*p* to clamp the bench 10 to a support structure in which the bench 10 is cantilevered from said support structure.

Figure 5:
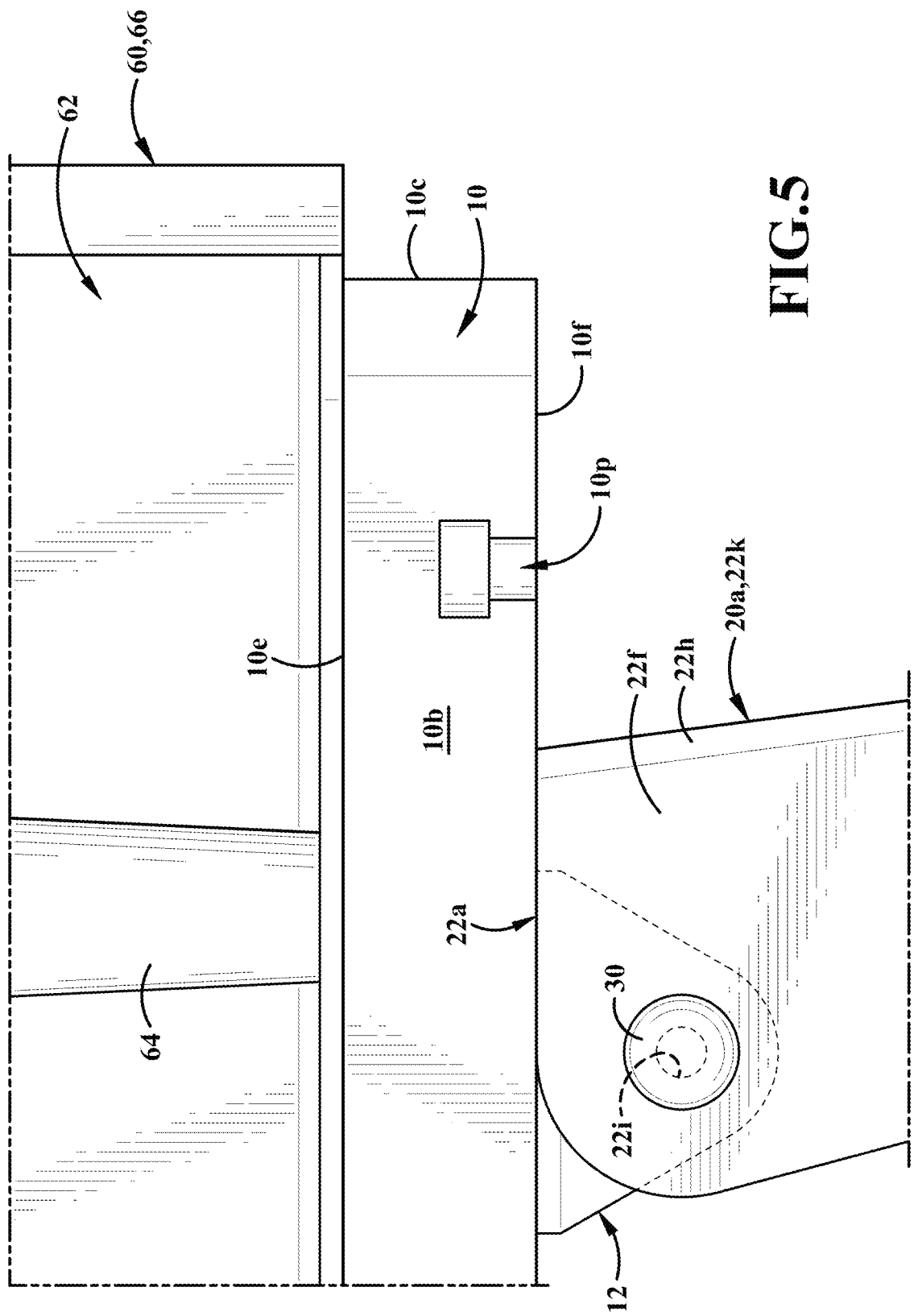
FIG. 5 (FIG. 5) is a partial rear elevation of the portable router base taken in the direction of line 5-5 shown in FIG. 2.
Figure 6:
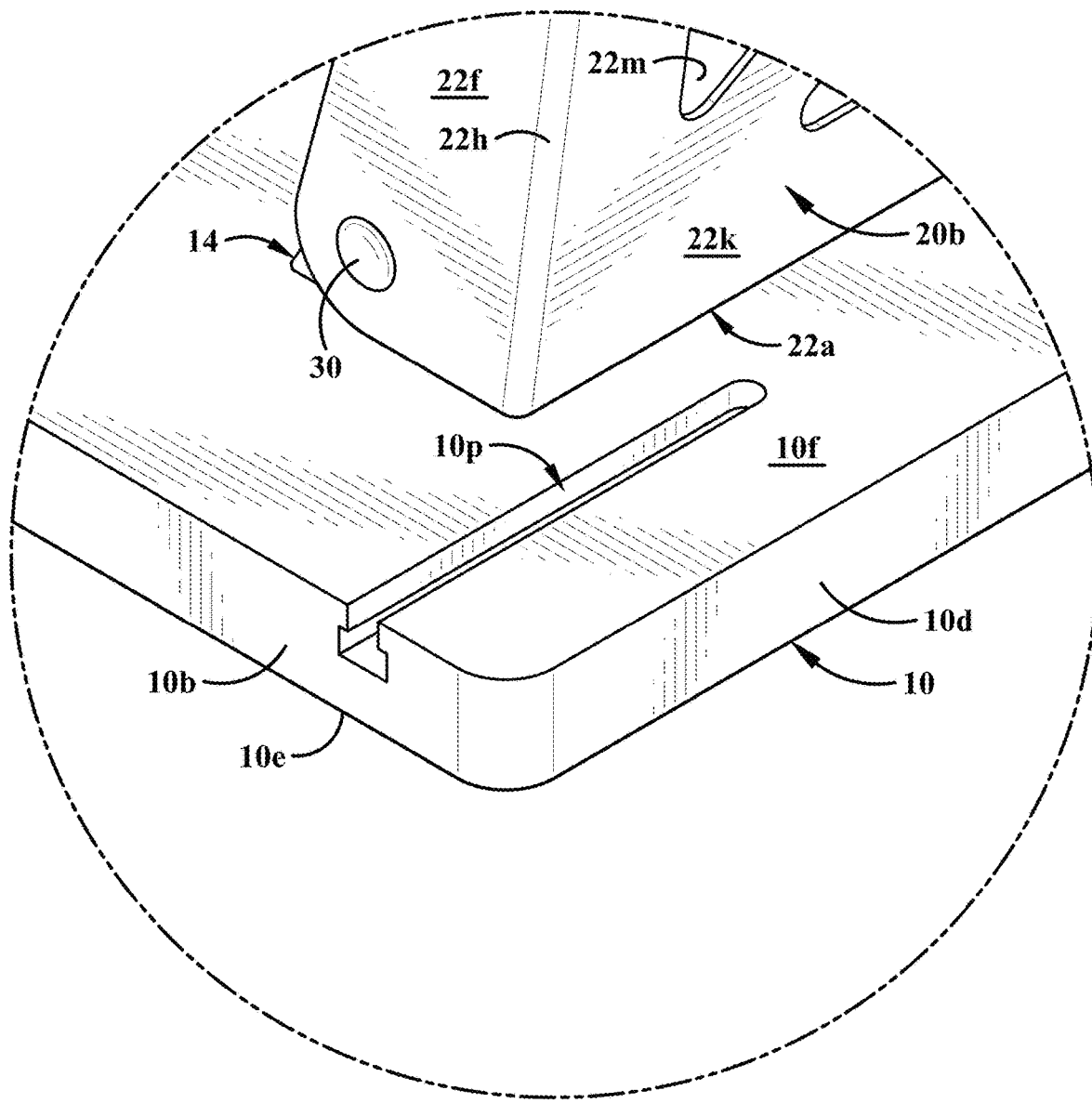
FIG. 6 (FIG. 6) is a partial bottom, rear, second side perspective view of a bottom slot defined in the portable router table.

In the present disclosure, each slot of the top pair of slots 10*n* and the bottom pair of slots 10*p* has a T-shaped cross-section when viewed from a rear elevation view (see FIG. 5). Such T-shaped configuration of each slot of the top pair of slots 10*n* and the bottom pair of slots 10*p* may allow a F-clamp or similar clamp to engage with the bench 10. In other exemplary embodiments, each slot of the top pair of slots 10*n* and the bottom pair of slots 10*p* may define any suitable shape as dictated by the implementation of bench 10, including the type of clamp that may be used with the bench 10.

Figure 9:
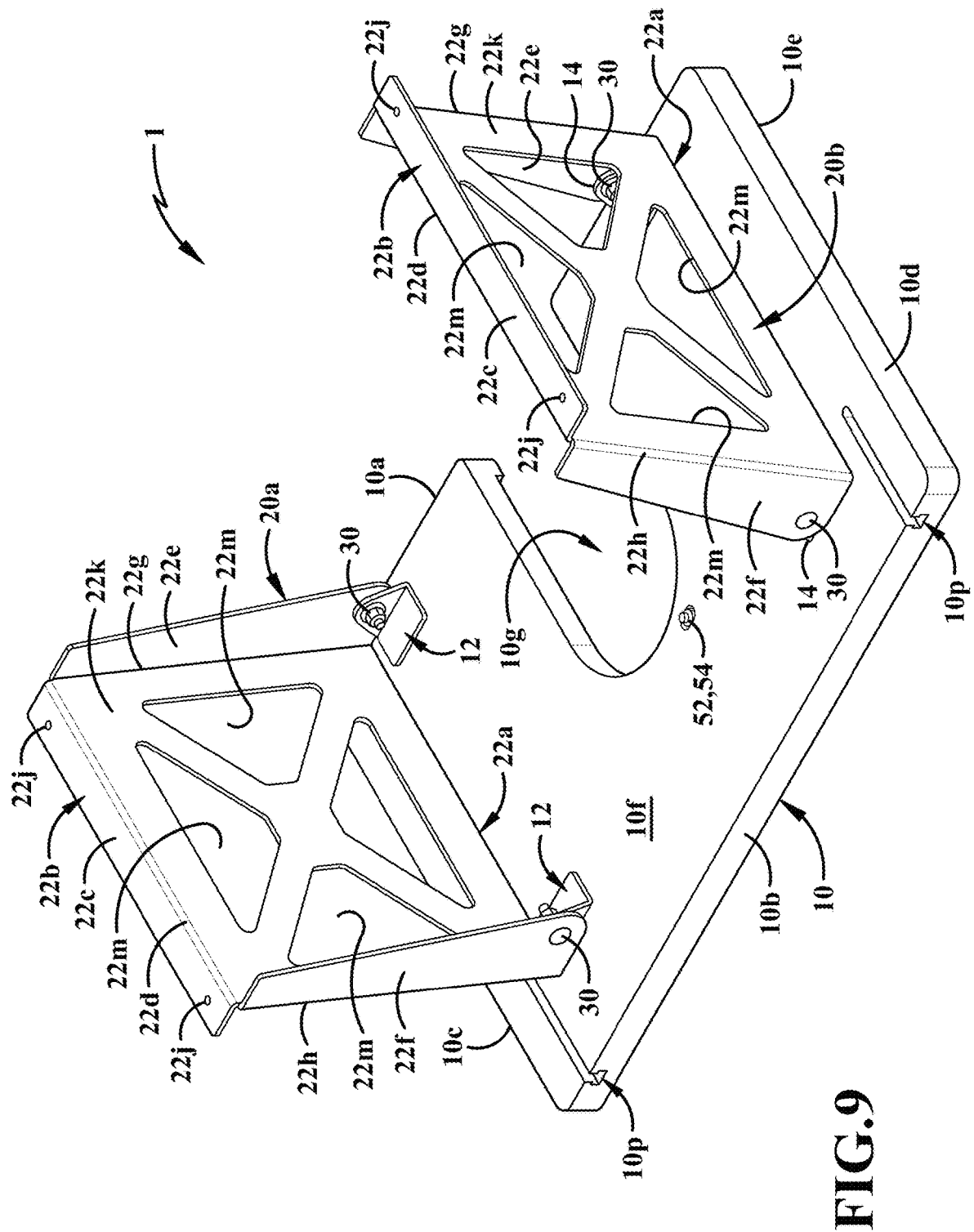
FIG. 9 (FIG. 9) is a rear, bottom, first side isometric perspective view of the portable router table, wherein a pair of legs of the portable router base is in an extended position.

Portable router table 1 also includes a first pair of mounts 12 that operably engage with the bench 10. As best seen in FIG. 9, each mount of the first pair of mounts 12 operably engages with the bottom surface 10*f* of the bench 10 and extends away from the bench 10. Still referring to FIG. 9, each mount of the first pair of mounts 12 is also positioned proximate to the first side 10*c* of the bench 10 and is positioned between a first slot of the bottom pair of slots 10*p* and the front opening 10*g*. Similarly, portable router table 1 also includes a second pair of mounts 14 that operably engage with the bench 10; the second pair of mounts 14 is positioned longitudinally opposite to the first pair of mounts 12 on bench 10 relative to the longitudinal axis of bench 10. As best seen in FIG. 9, each mount of the second pair of mounts 14 operably engages with the bottom surface 10*f* of the bench 10 and extends away from the bench 10. Still referring to FIG. 9, each mount of the second pair of mounts 14 is also positioned proximate to the second side 10*d* of the bench 10 and is positioned between a second slot of the bottom pair of slots 10*p* and the front opening 10*g*. Such use and purpose of the first pair of mounts 12 and the second pair of mounts 14 are discussed in greater detail below.

Portable router table 1 also includes a pair of legs 20*a*, 20*b*. As best seen in FIG. 9, each leg of the pair of legs 20*a*, 20*b* operably engages with the bench 10 at the bottom surface 10*f*. Particularly, each leg of the pair of legs 20*a*, 20*b* pivotably engages with the first pair of mounts 12 and the second pair of mounts 14. As discussed in greater detail below, each leg of the pair of legs 20*a*, 20*b* may transition between an extended or operating position (see FIG. 9) and a collapsed or stored position (see FIG. 10) depending on the intended use of portable router table 1. Such collapsing of the pair of legs 20*a*, 20*b* from the operating position to the stored position is denoted by arrows labeled "C" in FIG. 10.

It should be understood that each leg of the pair of legs 20a, 20b is identical to one another, but the first leg 20a of the pair of legs 20 pivotably engages with the first pair of mounts 12 and the second leg 20b of the pair of legs 20 pivotably engages with the second pair of mounts 14. For brevity, the first leg 20a of the pair of legs 20 will be discussed herein given the identical configuration with the second leg 20b of the pair of legs 20. It should be understood that while the first leg 20a of the pair of legs 20 is discussed herein, such components and/or features apply equally to the second leg 20b of the pair of legs 20.

As best seen in FIG. 9, first leg 20a includes a first or top end 22a and a second or bottom end 22b that is opposite to the first end 22a. First leg 20a also includes a foot 22c that extends outwardly from a bend 22d defined in first leg 20a to the second end 22b of first leg 20a; as such, foot 22c includes the second end 22b. In the present disclosure, second end 22b and foot 22c are collectively offset from the first end 22a relative to a lengthwise axis the extends between the first end 22a to the bend 22d. As discussed in greater detail below, foot 22c is configured to engage with a work surface or support surface of a support structure to provide stability in a first plane to the portable router table 1 when the first leg 20a is in the operating position.

Still referring to FIG. 9, first leg 20a also includes a front support 22d that extends lengthwise between the first end 22a and the second end 22b of first leg 20a and faces in the same direction as the first end 10a of bench 10. First leg 20a also includes a rear support 22e that extends lengthwise between the first end 22a and the second end 22b of first leg 20a and faces in the same direction as the second end 10b of bench 10. In the present disclosure, the front support 22d and the rear support 22e face in opposing directions relative to one another. The front support 22d and the rear support 22e are also offset from the foot 22c relative to the lengthwise axis of first leg 20a due to the front support 22e and the rear support 22f extending in a second direction from a first vertical bend 22g and a second vertical bend 22h. In the present disclosure, each of the first vertical bend 22g and the second vertical bend 22h extends lengthwise between the first end 22a and horizontal bend 22d along the lengthwise axis of first leg 20a. As discussed in greater detail below, the front support 22e and the rear support 22f are configured to engage with bench 10 and a work surface or support surface of a support structure to provide stability in a second plane to the portable router table 1 when the first leg 20a is in the operating position; the second plane is substantially parallel with the first plane of the foot 22c.

Still referring to first leg 20a, first leg 20a also defines a pair of pivot holes 22i. As best seen in FIG. 9, a first pivot hole of the pair of pivot holes 22i is defined in the front support 22e of first leg 20a, and a second pivot hole of the pair of pivot holes 22i is defined in the rear support 22f of first leg 20a. As discussed in greater detail below, the pair of pivot holes 22i of first leg 20a is aligned with openings in the first pair of mounts 12 so that pivot mechanisms of portable router table 1 pivotably engage first leg 20a with the bench 10. Similarly, such alignment is identical between the second pair of mounts 14 and second leg 20b so that pivot mechanisms of portable router table 1 pivotably engage second leg 20b with the bench 10.

Still referring to first leg 20a, foot 22c defines a set of attachment holes 22j. As best seen in FIG. 9, each attachment hole of the set of attachment holes 22j extends entirely through foot 22c in which a connector, fastener, or bolt may pass through foot 22c for fixedly engaging the foot 22c with a support structure. Such use of the set of attachment holes 22j may be desired by a woodworker when the woodworker intends to keep or maintain the portable router table 1 permanently or to provide a more rigid configuration to prevent any shifting of the table 1 when routing or cutting various types of workpiece.

Still referring to first leg 20a, first leg 20a also defines a set of cross members or struts 22k between the first end 22a and the second end 22b. As best seen in FIG. 9, each cross member 22k provides stability to first leg 20a in both a lateral or transverse direction as well as in a vertical direction. Such inclusion of cross members 22k also eliminates weight from first leg 20a by removing material from first leg 20a instead of having a solid wall extending between the first end 22a and the second end 22b. It should be understood, however, that in other exemplary embodiments, such legs discussed herein may include solid walls if desired.

Figure 10:
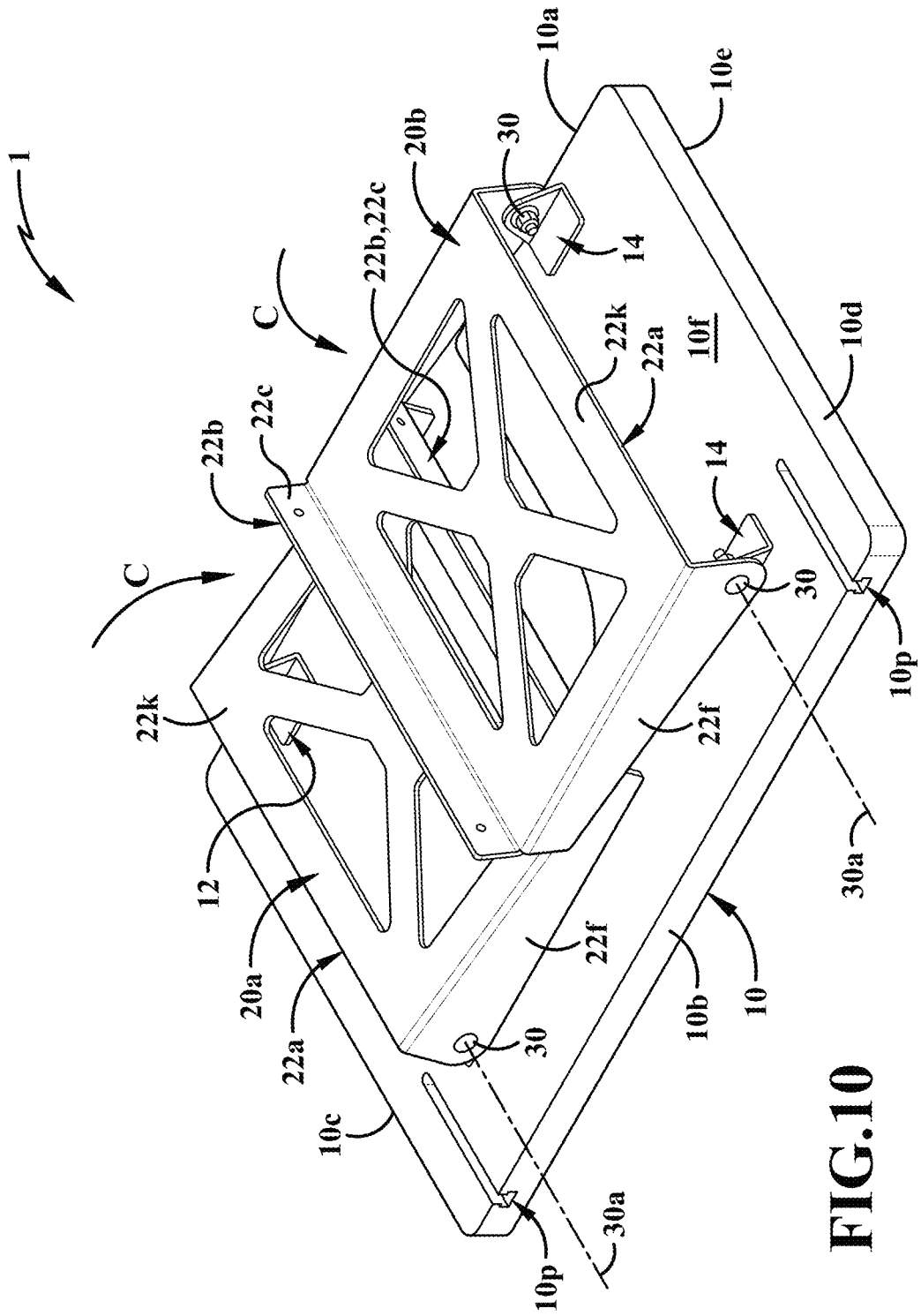
FIG. 10 (FIG. 10) is a rear, bottom, first side isometric perspective view of the portable router table, wherein the pair of legs of the portable router base is translated from the extended position to a collapsed position.
Figure 11:
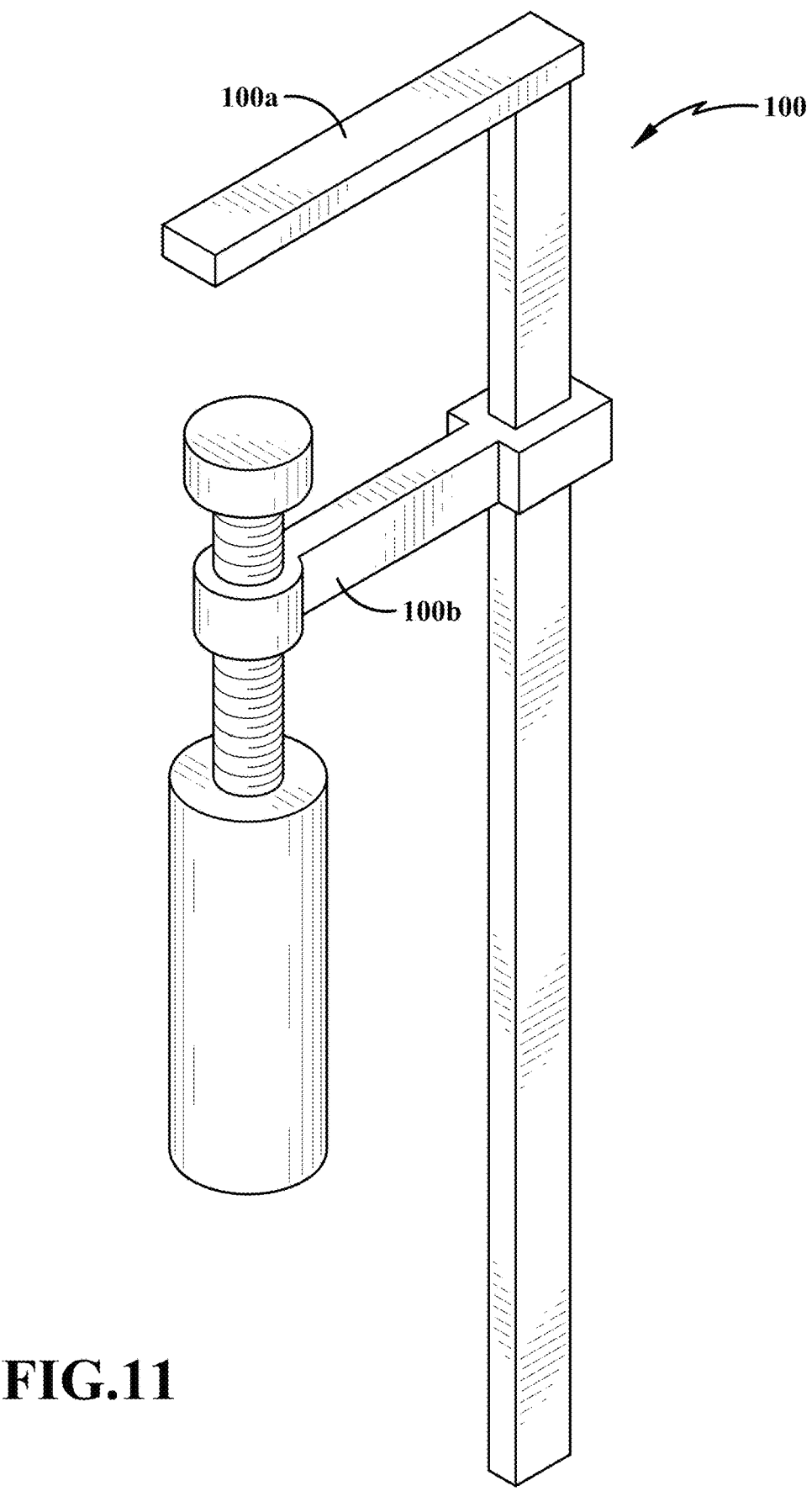
FIG. 11 (FIG. 11) is a top perspective view of an exemplary clamp.

Portable router table 1 also includes a set of pivot mechanisms 30 that pivotably engage the pair of legs 20a, 20b with the first pair of mounts 12 and the second pair of mounts 14. As best seen in FIG. 9, two pivot mechanisms of the set of pivot mechanism 30 pivotably engage first leg 20a with the first pair of mounts 12 so that first leg 20a is pivotable between the operating position (see FIG. 9) and the stored position (FIG. 10). Similarly, two different pivot mechanisms of the set of pivot mechanism 30 pivotably engage second leg 20b with the second pair of mounts 14 so that second leg 20b is pivotable between the operating position (see FIG. 9) and the stored position (FIG. 10). It should be understood that each pivot mechanism of the set of pivot mechanisms 30 may include any suitable components in order for the pair of legs 20a, 20b to be pivotable between the operating position (see FIG. 9) and the stored position (FIG. 10). In the present disclosure, each pivot mechanism of the set of pivot mechanisms 30 includes a connector that pivotably engages a respective leg 20a, 20b with a respective mount 12, 14 discussed herein and is maintained with the respective leg 20a, 20b and the respective mount 12, 14 by a nut or retaining member. Each pivot mechanism of the set of pivot mechanisms 30 also includes a pivot axis 30a that extends along the length of the connector of each pivot mechanism of the set of pivot mechanism 30; the respective leg 20a, 20b pivots about the pivot axis 30a when moving from the operating position to the stored position.

Portable router table 1 also includes a removable router base 40 that is selectively operably engageable with the bench 10. As discussed in greater detail below, removable router base 40 (hereinafter "base 40") may be moveable between a first cutting orientation (see FIGS. 1-3 and FIGS. 12 and 13C) to a second cutting orientation (see FIGS. 7 and FIGS. 14A-14C) depending on the type of workpiece that must be routed and/or cut with a router attached to the removable router base 40. Such components of the base 40 are discussed in greater detail below.

Figure 8:
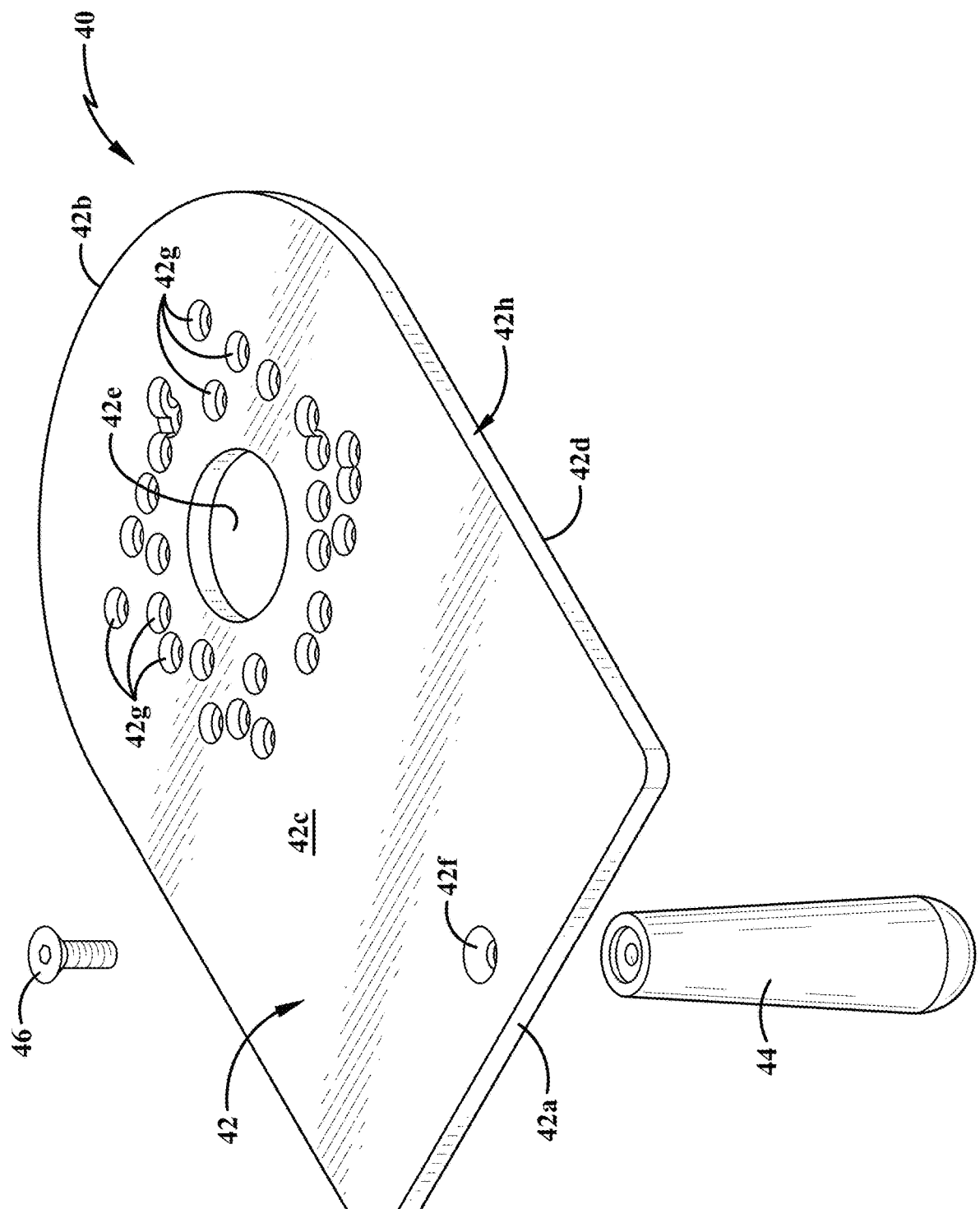
FIG. 8 (FIG. 8) is an exploded view of the removable router base.

Base 40 includes a plate 42 that is removably engageable with the bench 10 inside of the front opening 10g and the seating recess 10h. As best seen in FIG. 8, plate 42 includes a front or first end 42a, a rear or second end 42b that is opposite to the first end 42a, and a lengthwise axis defined therebetween. In the present disclosure, the second end 42b defines a rounded edge that corresponds to the rounded and/or curvilinear shape of the front opening 10g collectively defined by the internal lateral wall 10i and the internal base wall 10j. Still referring to FIG. 8, plate 42 also includes a first surface 42c that extends lengthwise between the first end 42a and the second end 42b and faces in a first direction. Plate 42 also includes a second surface 42d that extends lengthwise between the first end 42a and the second end 42b and faces in a second direction that is opposite to the first direction of first surface 42c.

Still referring to plate 42, plate 42 also defines a router bit opening 42e. As best seen in FIG. 8, router bit opening 42e is defined between the first end 42a and the second end 42b but is closer to the second end 42b. Router bit opening 42e also extends entirely through plate 42 between the first surface 42c and the second surface 42d such that the first surface 42c and the second surface 42d are in communication with one another at the router bit opening 42e. As discussed in greater detail below, router bit opening 42e is configured to allow a router bit that is equipped to a router to pass through the plate 42 when said router is operably engaged with the plate 42.

Still referring to plate 42, plate 42 also defines a countersunk aperture 42f. As best seen in FIG. 8, countersunk aperture 42f is defined between the first end 42a and the router bit opening 42e but is closer to the first end 42b. Countersunk aperture 42f also extends entirely through plate 42 between the first surface 42c and the second surface 42d such that the first surface 42c and the second surface 42d are in communication with one another at the countersunk aperture 42f. As discussed in greater detail below, countersunk aperture 42f enables a handle of base 40 to operably engage with the plate 42 so that a woodworker may easily grip and control base 40 during routing operations.

Still referring to plate 42, plate 42 also defines a plurality of attachment apertures 42g. As best seen in FIG. 8, the plurality of attachment apertures 42g is defined circumferentially about the router bit opening 42e close to the second end 42b. Each attachment aperture of the plurality of attachment apertures 42g also extends entirely through plate 42 between the first surface 42c and the second surface 42d such that the first surface 42c and the second surface 42d are in communication with one another at each attachment aperture of the plurality of attachment apertures 42g. It should be understood that the plurality of attachment apertures 42g includes individual sets of attachment apertures that enables a woodworker to operably engage a commercially-available router to the plate 42 based on the respective set of attachment apertures of the plurality of attachment apertures.

Still referring to plate 42, plate 42 also includes a peripheral wall 42h. As best seen in FIG. 8, peripheral wall 42 extends continuously between the first surface 42c and the second surface 42d. As discussed in greater detail below, peripheral wall 42h may contact and/or interface with the internal lateral wall 10i of bench 10 when the base 40 is in the first cutting orientation. As also discussed in greater detail below, peripheral wall 42h may also contact and/or interface with a retaining member of router table 1 to maintain the base 40 with the bench 1 in the first cutting orientation.

As mentioned previously, base 40 also includes a handle 44 that is operably engaged with the plate 42 by a bolt 46. As best seen in FIG. 1, handle 44 extends downwardly from the plate 42 when the handle 44 is engaged with the plate 42 by the bolt 46 at the countersunk aperture 42f. Here, the handle 44 is directly contacting the second surface 42d and is positioned below the first surface 42c so that the handle 44 does not impede or obstruct the woodworker when routing or cutting various types of workpiece along the bench 10 when the base 40 is provided in a first cutting orientation (see FIGS. 1-2, 12, and 13C). Additionally, the head of the bolt 46 is even with or positioned below the first surface 42c of the plate 42 to prevent marring or damage to a workpiece as said workpiece passes over the first surface 42c of plate 42 when the woodworker is routing or cutting various types of workpiece along the bench 10 in the first cutting orientation.

Figure 13C:
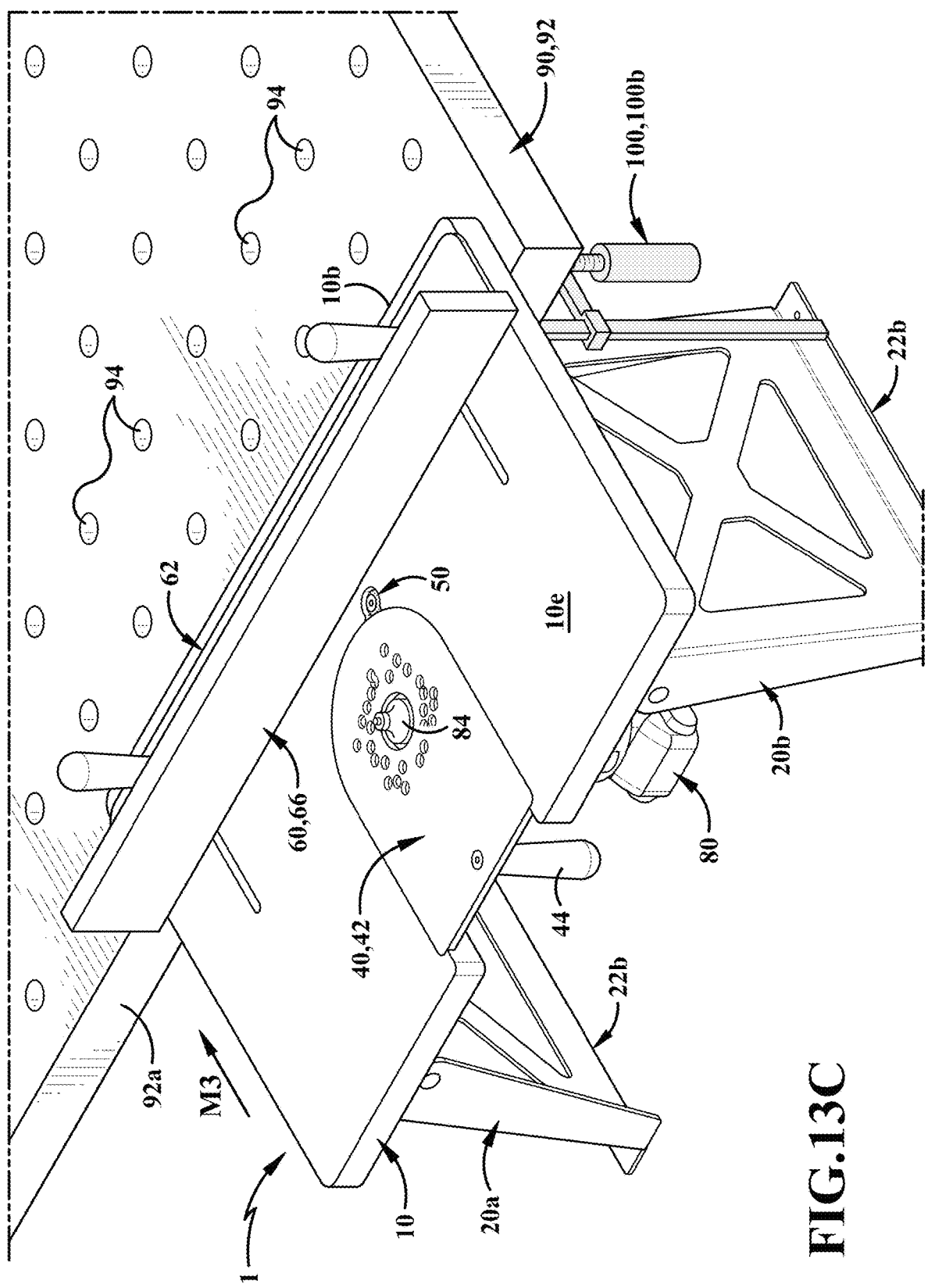
FIG. 13C (FIG. 13C) is another operational view continuing from FIG. 13B, wherein the portable router table is engaged to the support structure by the clamps, and wherein the portable router table is cantilevered from the support structure and the removable router base is in the first cutting orientation.
Figure 14A:
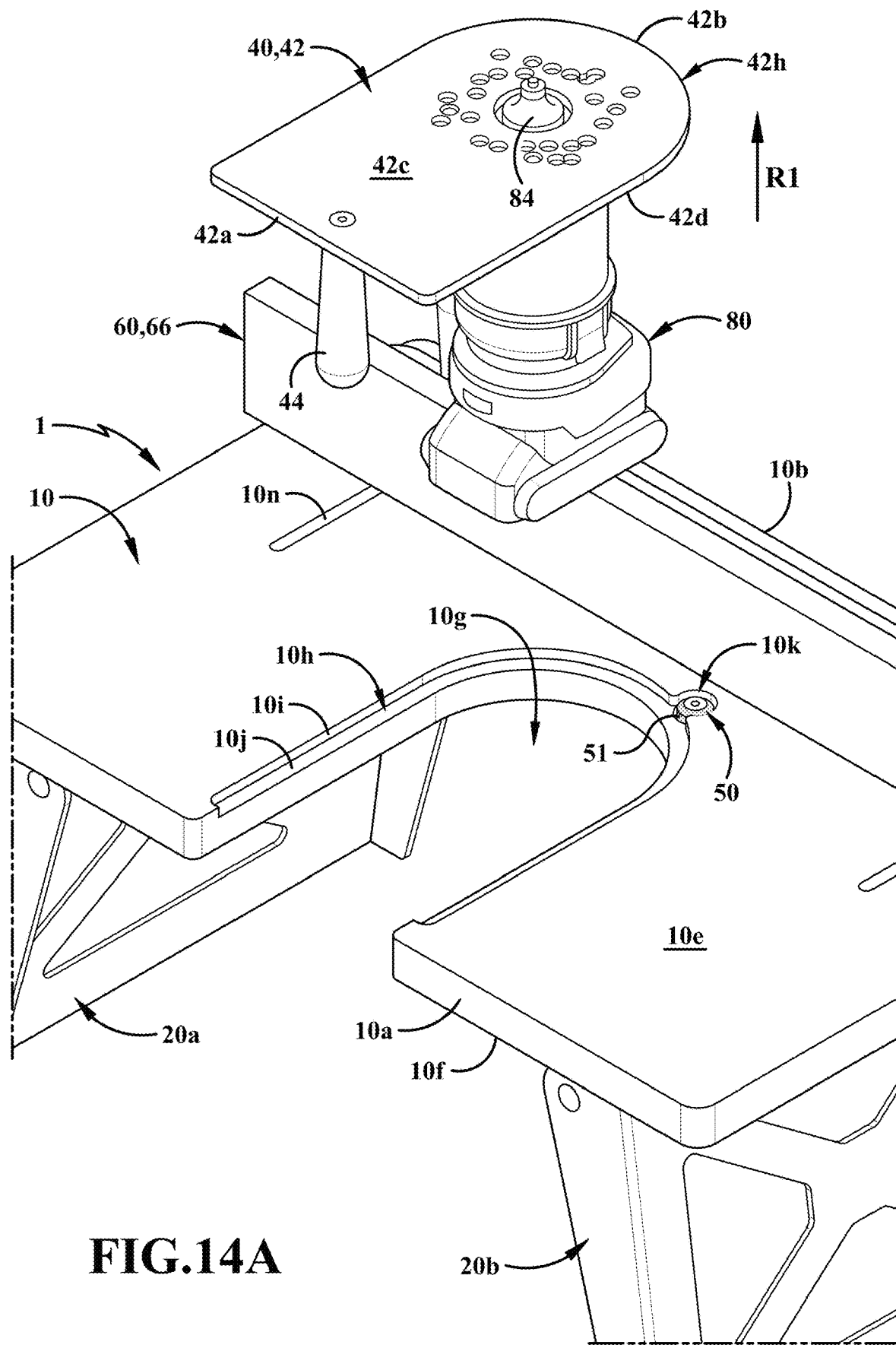
FIG. 14A (FIG. 14A) is an operational view of the removable router base and router being from removed from the portable router table.
Figure 14B:
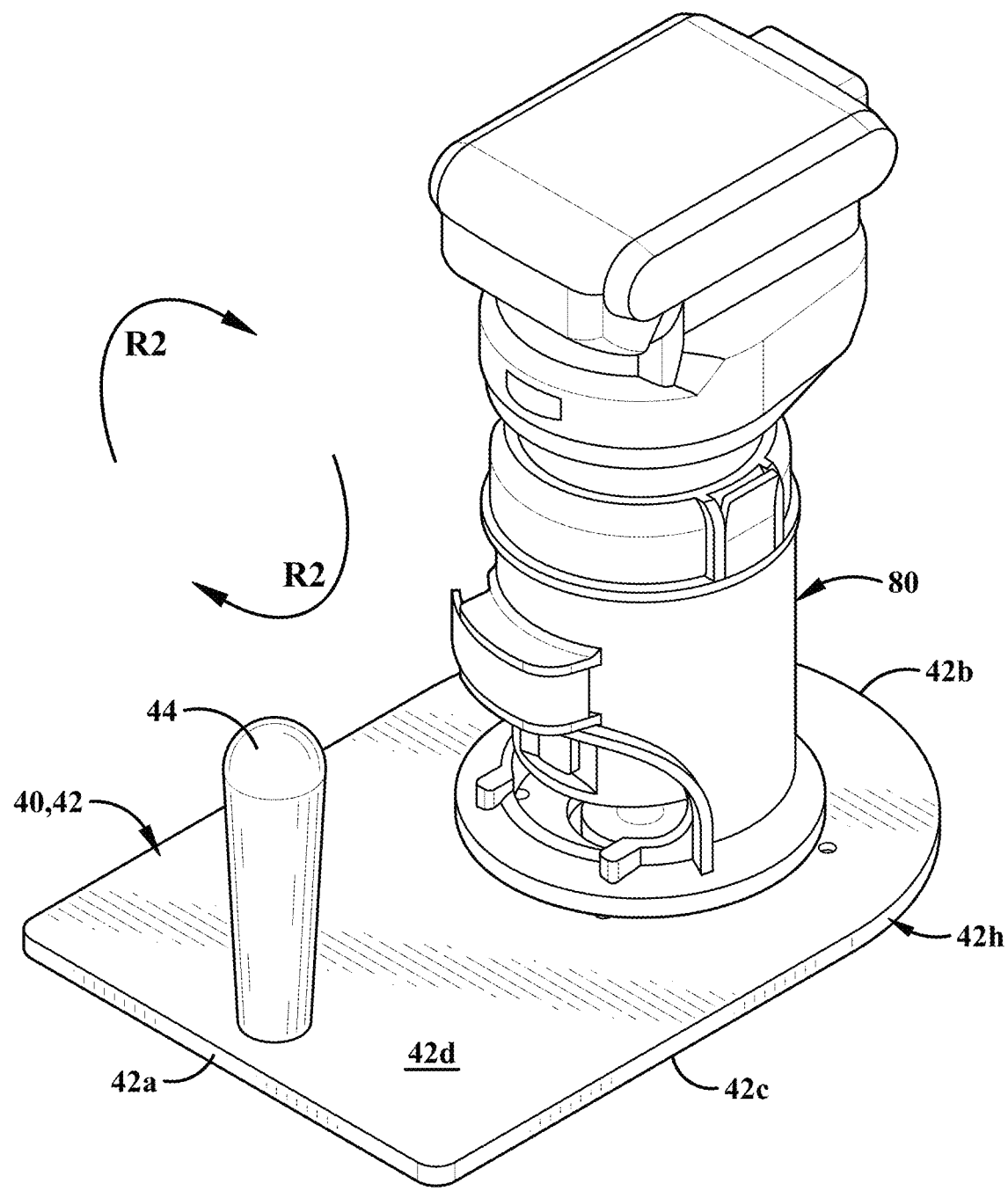
FIG. 14B (FIG. 14B) is another operational view continuing from FIG. 14A, wherein the removable router base is rotated to the second cutting orientation.
Figure 14C:
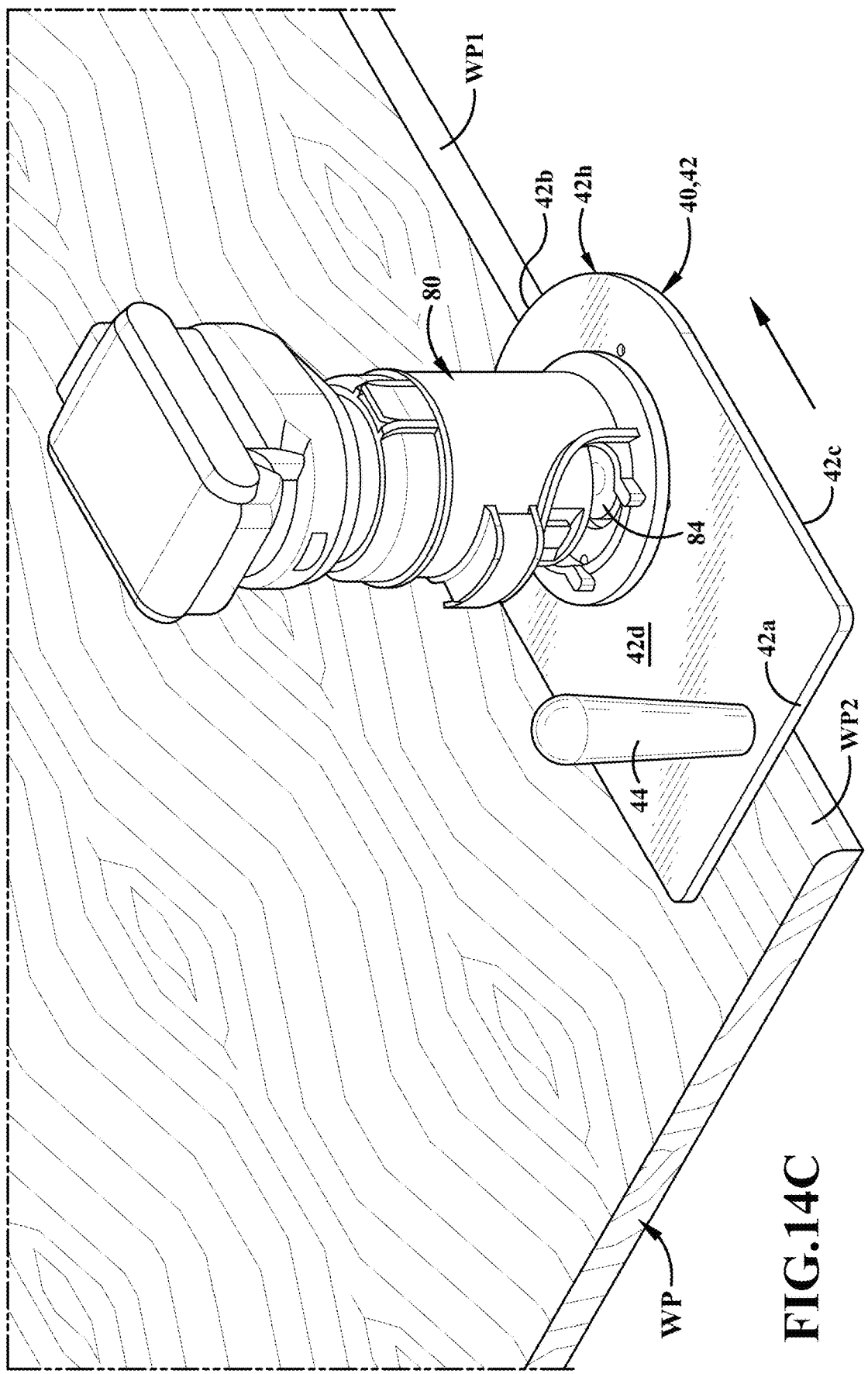
FIG. 14C (FIG. 14C) is another operational view continuing from FIG. 14A, wherein the removable router base is in the second cutting orientation and routes a workpiece remote from the portable router base.

As briefly mentioned above, base 40 is selectively engageable with the bench 10 between a first cutting orientation (see FIGS. 1-2, 12, and 13C) and a second cutting orientation (see FIGS. 14A-14C). In the first cutting orientation, base 40 is housed inside of the front opening 10g such that the top surface 10e of bench 10 and the first surface 42c of plate 42 of base 40 are even with one another to collectively define a continuous flat or planar surface. Such continuous surface allows a woodworker to move a workpiece along the bench 10 and base 40 with ease without being impeded or obstructed during a routing or cutting operation. In this first cutting orientation, base 40 is also housed and held inside of seating recess 10h collectively by the internal lateral wall 10i and the internal base wall 10j. Particularly, the plate 42 of base 40 is housed inside of seating recess 10h and is collectively held by the internal lateral wall 10i and the internal base wall 10j inside of the front opening 10g at the second surface 42d.

Still referring to the first cutting orientation, handle 44 of base 40 is also positioned below the bench 10. As discussed previously, such positioning of the handle 44 below the bench 10 in the first cutting orientation prevents the woodworker from being impeded or obstructed from moving various types of workpiece along the bench 10 during routing or cutting operations. In the first cutting orientation, the handle 44 is also easily accessible to a woodworker since the woodworker may simply pass his/her hand through the front opening 10g at the first end 10a of the bench 10 for grasping or gripping said handle 44. Such ease of accessibility enables a woodworker to transition the base 40 from the first cutting orientation to the second cutting orientation when workpiece is too large or cumbersome to cut or route on the bench 10.

In the second cutting orientation, base 40 is completely removed and spaced apart from bench 10 (see FIGS. 14A-14C). To accomplish this second cutting orientation, woodworker passes his/her hand through the front opening 10g at the first end 10a of the bench 10 and grasps the handle 44. As illustrated in FIG. 14A, woodworker applies an upward forward on the base 40, by the handle 44, until the base 40 and the attached router (discussed below) are removed from the front opening 10g of bench 10. At this stage, woodworker may then rotate base and the attached router (FIG. 14B) to route or cut various types of workpiece that are too large or cumbersome for bench 10.

Portable router table 1 also includes a retaining mechanism 50 that operably engages with the bench 10. As best seen in FIG. 4, retaining mechanism 50 includes a retaining member 51 that is substantially housed inside of cavity 10k of bench 10 while a portion of the retaining member 51 projects into the front opening 10g. Retaining mechanism 50 also includes a bolt 52 that threadably engages with a nut 54 to attach the retaining member 51 with the bench 10 at the through-hole 10m.

Figure 3:
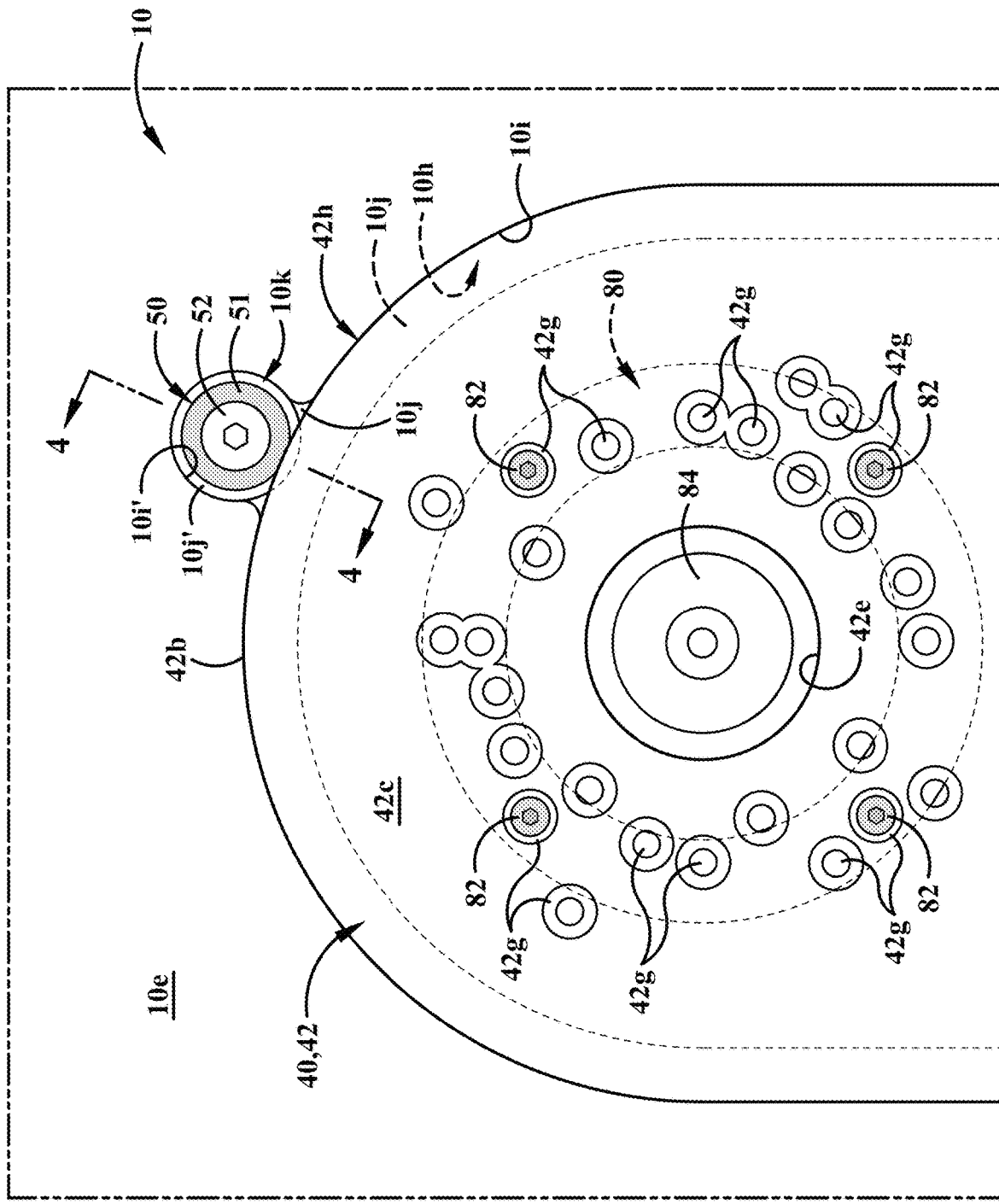
FIG. 3 (FIG. 3) is a partial top plan view of the portable router table and the removable router base.

It should be understood that retaining member 51 is made from a resilient and/or elastic material that is able to deform when a force is applied against the retaining member 51. As best seen in FIG. 3, the portion of the retaining member 51 that projects into the front opening 10g deforms when the plate 42 of base 40 directly contacts the retaining member 51, particularly the peripheral wall 42h of plate 42. When such contact occurs between the plate 42 and retaining member 51, retaining member 51 applies a retention force on the plate 42 so that the plate 42 in frictional fit between at least the internal lateral wall 10*i* and the retaining member 51. Such retention force applied on the plate 42 prevents the plate 42 from disengaging the bench 10 when the portable router table 1 is transported, when a router tool is engaged with the plate 42, or when the portable router table 1 is being used to route or cut various types of workpiece. It should be understood that such retention force may be overcome by the woodworker when the woodworker applies an upward force on the base 40 at the handle 44.

Portable router table 1 also includes a fence 60 that is selectively operably engageable with the bench 10. As best seen in FIGS. 1-2, fence 60 includes a frame 62 that is selectively operably engageable with the bench 10 inside of the top pair of slots 10*n* by a pair of clamping handles 64. Fence 60 also includes a guide 66 that is fixedly engaged with the frame 62. In operation, woodworker may move fence 60 transversely between first end 10*a* and second end 10*b* to set a desired cutting distance between the guide 66 and a router bit equipped to a router.

Having now discussed the components of the portable router table 1, methods of using the portable router table 1 at various orientations and/or configurations for cutting operations are discussed in greater detail below.

Figure 12:
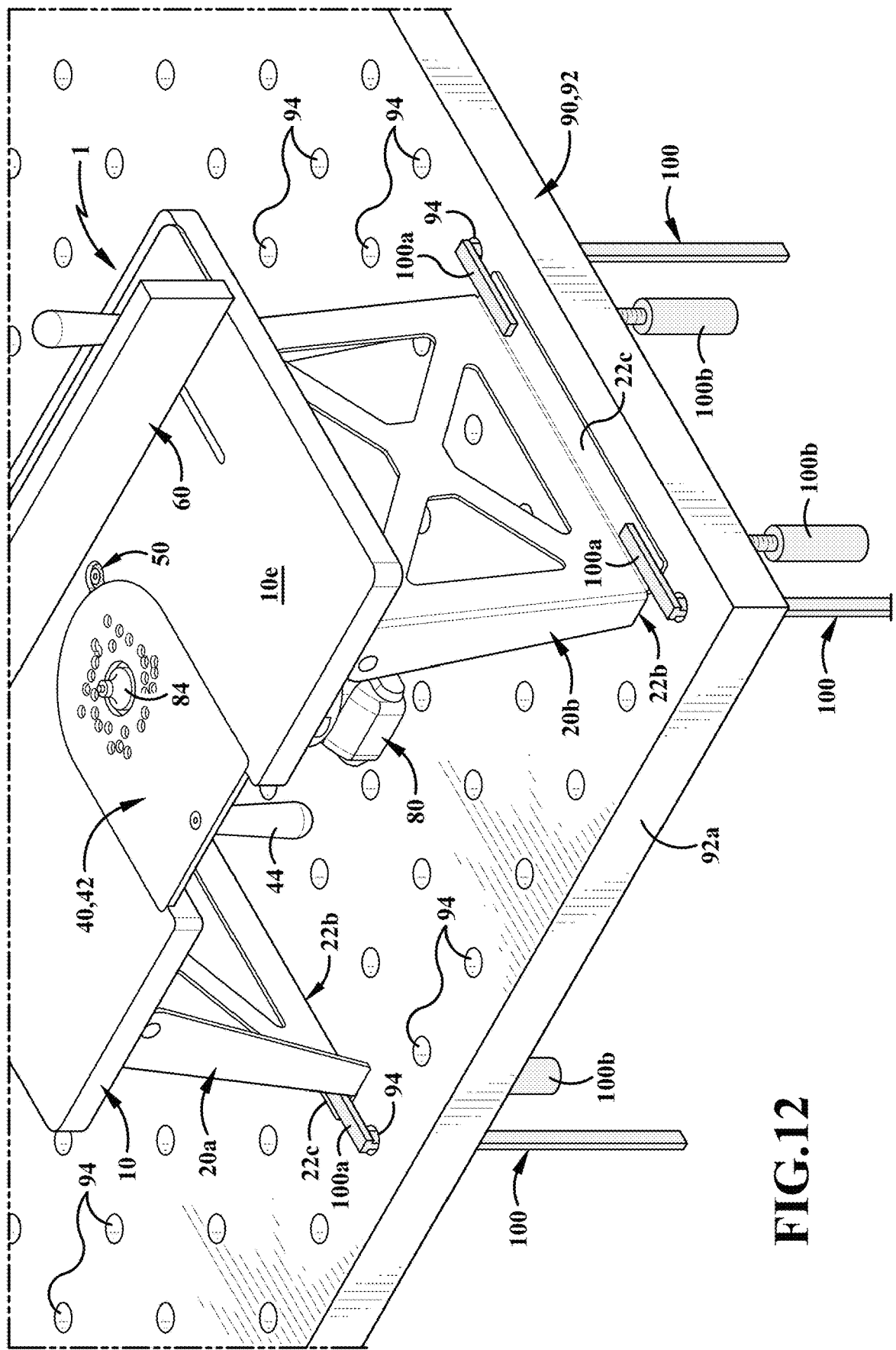
FIG. 12 (FIG. 12) is an operational view of the portable router base supported to a support structure, wherein clamps are secured to feet of the pair of legs and the removable router base is in the first cutting orientation.

Prior to engaging the portable router table 1 with a support structure or similar woodworking tool, woodworker may engage a router 80 with the plate 42 of base 40 at the plurality of attachment apertures 42*g*. As stated previously, a group or set of attachment apertures of the plurality of attachment apertures 42*g* is selected by the woodworker based on the manufacturer of said router 80. Once the set of apertures of the plurality of attachment apertures 42*g* are selected, the router 80 is engaged with the plate 42 via a set of fasteners 82 (see FIG. 3). A router bit 84 is also equipped to the router 80 based on the desired routing or cutting operations that woodworker is about to perform. As best seen in FIGS. 1-2 and 12, router bit 84 projects through the router bit opening 42*e* defined in the plate 42 of base 40 where the plate 42 is free from interfering with the router bit 84 when rotated by router 80.

FIG. 12 illustrates a first configuration of portable router table 1 where portable router table 1 is placed and clamped to a support structure 90 where the portable router table 1 is entirely on top of the support structure 90. In the present embodiment, at least one clamp 100 engages with each leg of the pair of legs 20*a*, 20*b* to maintain the portable router table 1 with support structure 90. Particularly, at least one clamp 100 engages with the foot 22*c* of each leg of the pair of legs 20*a*, 20*b* to maintain the portable router table 1 with support structure 90. In this example, support structure 90 is a router table where the support structure 90 includes a table 92 that defines a plurality of clamp holes 94 for receiving clamps 100.

Such first configuration may be desirable for a woodworker when the woodworker is not limited on space along the table 92 of support structure 90 or needs additional height when routing or cutting a workpiece with portable router table 1.

Figure 13A:
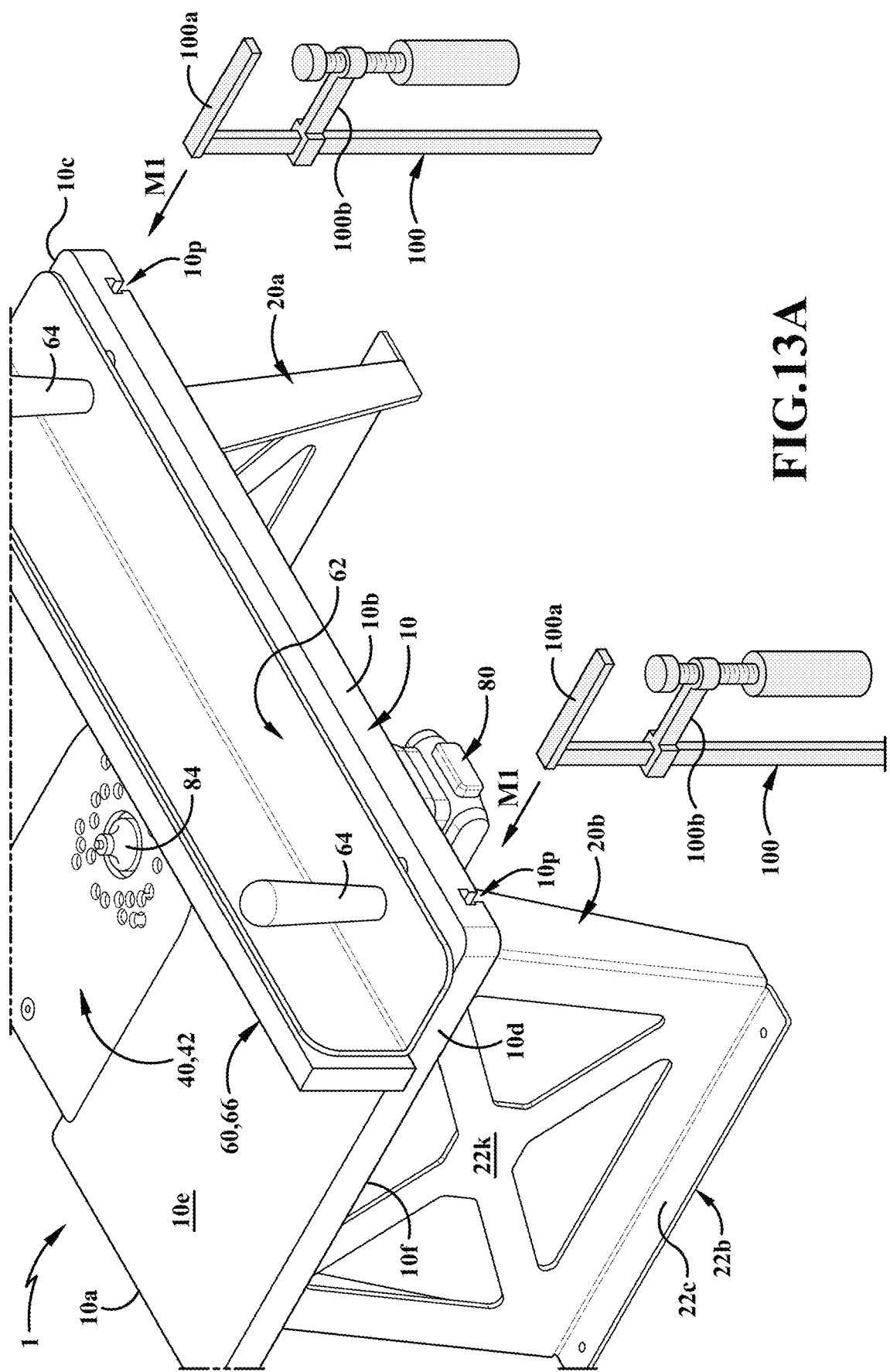
FIG. 13A (FIG. 13A) is an operational view of clamps operably engaging with a bench of the portable router base.
Figure 13B:
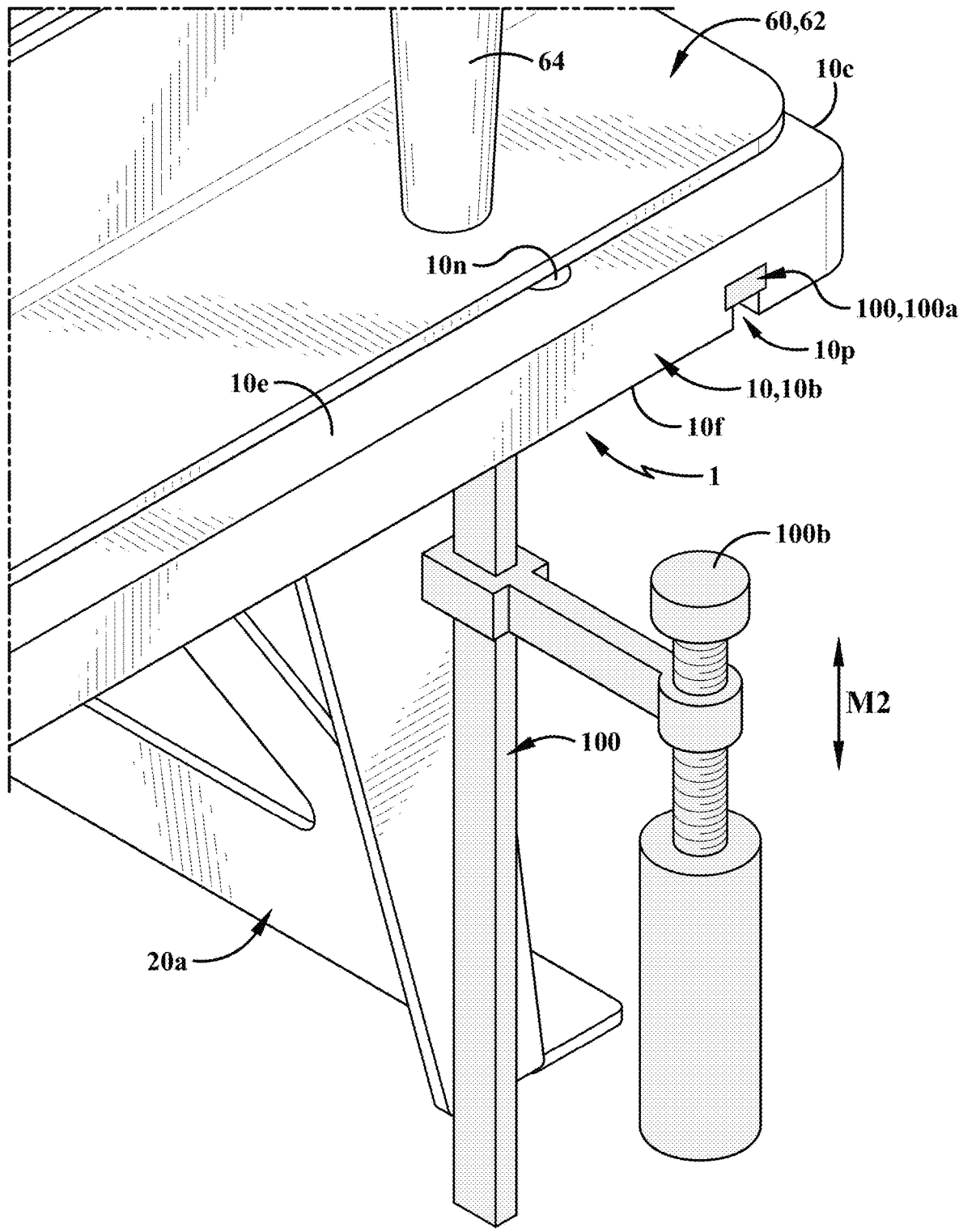
FIG. 13B (FIG. 13B) is another operational view continuing from FIG. 13A, wherein a handle of the clamps are shown being moveable for clamping operations.

FIGS. 13A-13C illustrates a second configuration of portable router table 1 where portable router table 1 is clamped to support structure 90 where the portable router table 1 is suspended and/or cantilevered from the support structure 90. Prior to suspension of portable router table 1, woodworker must first introduce and slide a fixed jaw 100*a* of each clamp 100 into a respective slot of the bottom pair of slots 10*p* defined in the bench 10; such sliding of the clamps 100 into the bench is denoted by arrows labeled "M1" in FIG. 13A.

In this configuration, the woodworker slides the fixed jaw 100*a* of each clamp 100 into the second end 10*b* of the bench 10 until the fixed jaw 100*a* of each clamp 100 is seated inside of the respective slot of the bottom pair of slots 10*p*. Once seated, the woodworker may then collectively move the portable router table 1 and the clamps 100 towards an edge 92*a* of the table 92 until the fixed jaw 100*a* of each clamp 100 is substantially contacting the top surface of the table 92 for clamping means. The woodworker may then translate a moveable jaw 100*b* of each clamp 100 towards the bottom surface of table 92 and the respective fixed jaw 100*a* until the clamp 100 provides adequate clamping force to cantilever the portable router table 1 from the support structure 90; such translation of moveable jaws 100*b* is denoted by an arrow labeled "M2" in FIG. 13B. Prior to clamping the moveable jaw 100*b* of each clamp 100 to the table 92, the woodworker slides the portable router table 1 and the clamps 100, collectively, onto the table 92 at a respective edge or end of the table (e.g., front edge 92*a*); such sliding of the portable router table 1 and the clamps 100, collectively, onto the table 92 is denoted by an arrow labeled "M3" in FIG. 13C.

Such second configuration may be desirable for a woodworker when the woodworker is limited on space along the table 92 of support structure 90 or needs the entire surface area of the table 92 for other woodworking needs along with routing and/or cutting various types of workpiece. As such, the woodworker does not need to sacrifice or dedicate a section of the table 92 when a separate woodworking operation is needed on table 92. In one example, woodworker may perform a first woodworking operation when portable router table 1 is cantilevered from a support structure 90 (e.g., routing or cutting various types of workpiece with router 80 when base 40 is in the first orientation) and a second woodworking operation on table 92 that is separate from the first woodworking operation. Such second woodworking operation may be any suitable woodworking operation that is commonly performed by woodworkers or is commonly performed by a woodworker when using router 80 or other woodworking tools.

FIGS. 14A-14C illustrate a third configuration of portable router table 1 where base 40 is removed from bench 10 for routing or cutting a stock or workpiece that is too large or cumbersome to cut along bench 10. As such, base 40 is oriented from the first orientation (see FIGS. 1 and 12) to the second orientation (see FIG. 14A) in which the base 40 is removed and separated from the bench 10 by the woodworker. Such removal of the base 40 by the woodworker is denoted by an arrow labeled "R1" in FIG. 14A.

Once removed, woodworker may then rotate the base 40 and the router 80 180 degrees from the first orientation to the second orientation. As best seen in FIG. 14B, the base 40 and router 80 have been rotated to the second orientation by the woodworker in which the router 80 is now positioned above and/or extends vertically from the second surface 42*d* of base 40. Such rotation of base 40 and router 80 from the first orientation to the second orientation is denoted by arrows labeled "R2" in FIG. 14B.

Once in the second orientation, the woodworker may then collectively introduce the base 40 and the router 80 to a desired workpiece (workpiece denoted as "WP" in FIG. 14C). Once the base 40 is resting on the workpiece, the woodworker may then operate the router 80 to route or cut into the workpiece for various reasons. As discussed previously, base 40 acts a planar or flat support so that router 80 is free from swaying or titling as the woodworker runs the router 80 along a portion of the workpiece. As best seen in FIG. 14C, base 40 and router 80 are placed on workpiece in which router 80 cuts into a straight edge of workpiece "WP1" to create a rounded edge "WP2" along workpiece.

FIGS. 15-18B illustrate a micro-adjuster assembly 120 that operably engages with an alternative frame 62' of fence 60'. It should be noted that frame 62' is similar to frame 62 of fence 60 discussed above and illustrated in FIGS. 1-2, expect as detailed below. It should also be noted that clamping handles 64' and guide 66' of fence 60' are identical to the clamping handles 64 and guide 66 discussed above. The following components and features of the frame 62' and micro-adjuster assembly 120 are now discussed in greater detail below.

Figure 15:
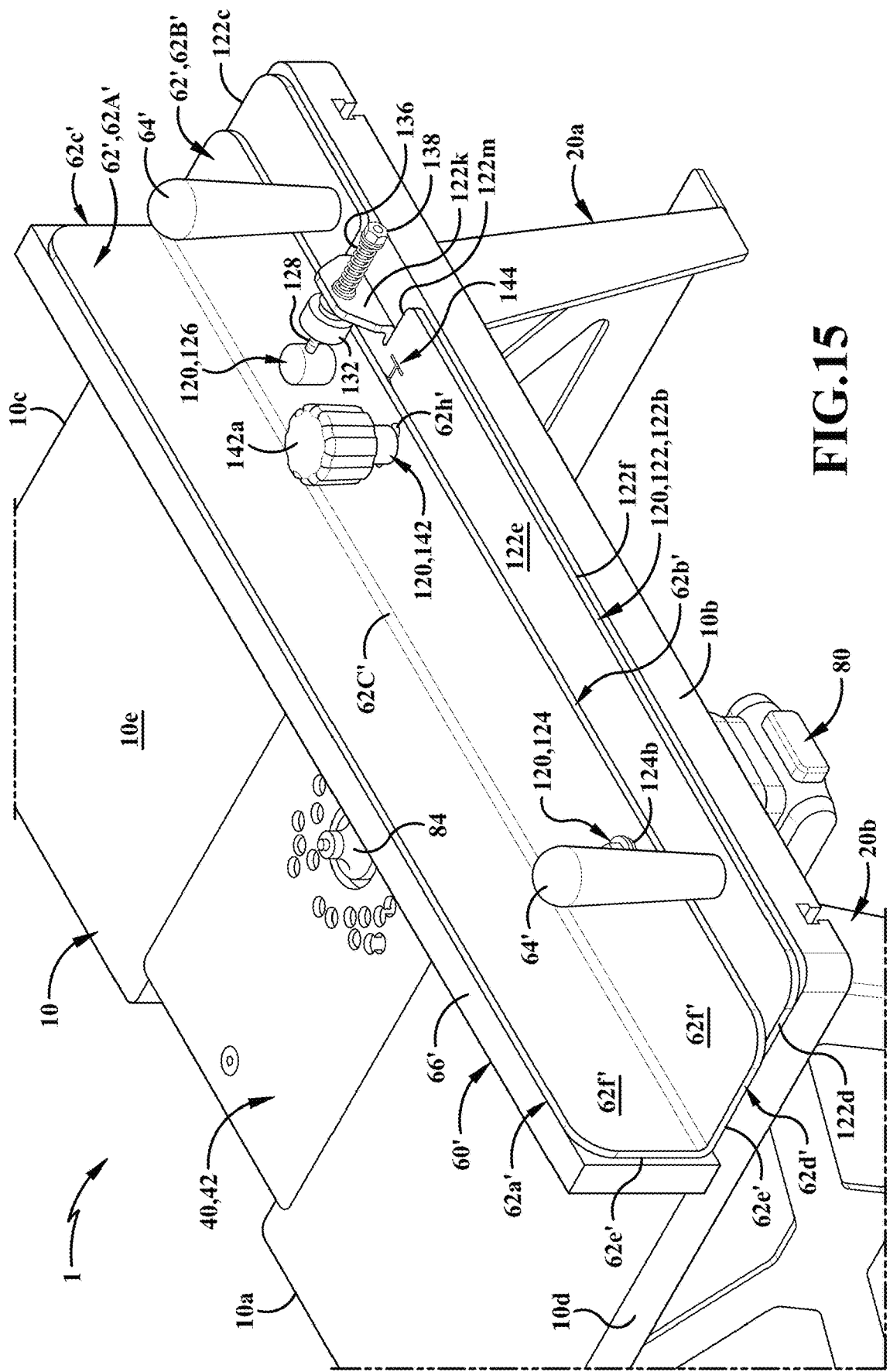
FIG. 15 (FIG. 15) is a partial rear, top, second side isometric perspective view of the portable router table in accordance with another aspect of the present disclosure, wherein the portable router table includes an alternative fence and a micro-adjuster assembly.

As best seen FIG. 15, frame 62' includes a first end 62a' that operably engages with guide 66', a second end 62b' that is opposite to the first end 62a', and a first axis defined therebetween. Frame 62' also includes a first side 62c', a second side 62d' that is opposite to the first side 62c', and a second axis defined therebetween which is orthogonal to the first axis. Frame 62' also includes an outer surface 62e' that contacts guide 66' and base plate of micro-adjuster assembly 120, and an inner surface 62f' that is opposite to the outer surface 62e' and is free from contacting guide 66'.

Still referring to FIG. 15, frame 62' defines a T-shaped configuration when viewed from a side elevation view. In the present disclosure, frame 62' includes a first major wall 62A' that operably engages with guide 66', and a second major wall 62B' that operably engages with a base plate of a micro-adjuster assembly. Additionally, frame 62' defines a bend 62C' that separates the first major wall 62A' and the second major wall 62B' from one another. With such structural configuration, the first major wall 62A' and the second major wall 62B' define a continuous, unitary member from the first end 62a to the second end 62b. In other exemplary embodiments, first and second major walls of a frame may be two separate piece that are attached to one another to collectively define the frame.

Figure 16:
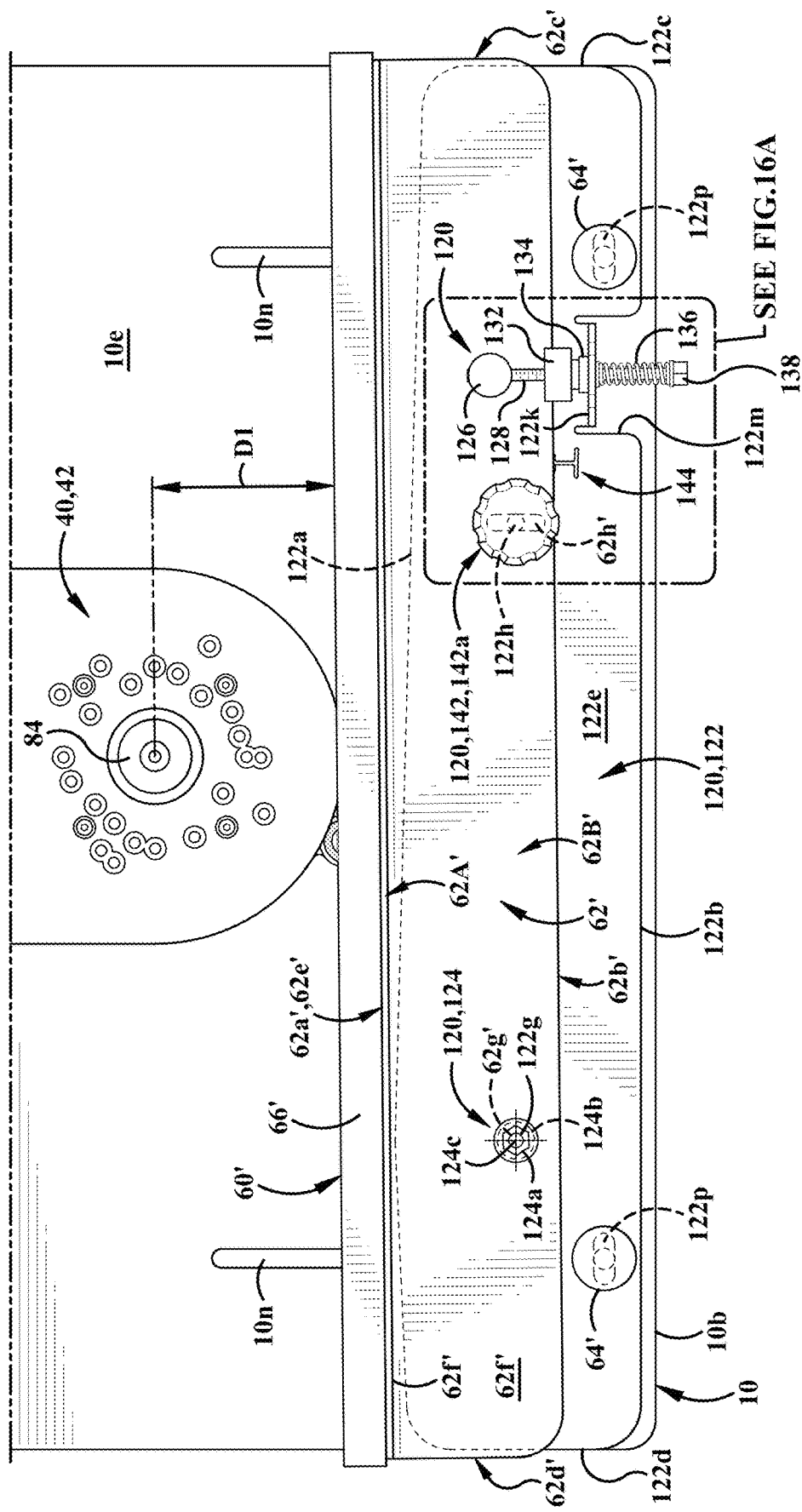
FIG. 16 (FIG. 16) is a partial top plan view of the portable table shown in FIG. 15, wherein the fence is positioned at a starting point and is measured at a first distance from a router bit equipped to the router FIG. 16A (FIG. 16A) is an enlargement of the highlighted region shown in in FIG. 16.
Figure 16A:
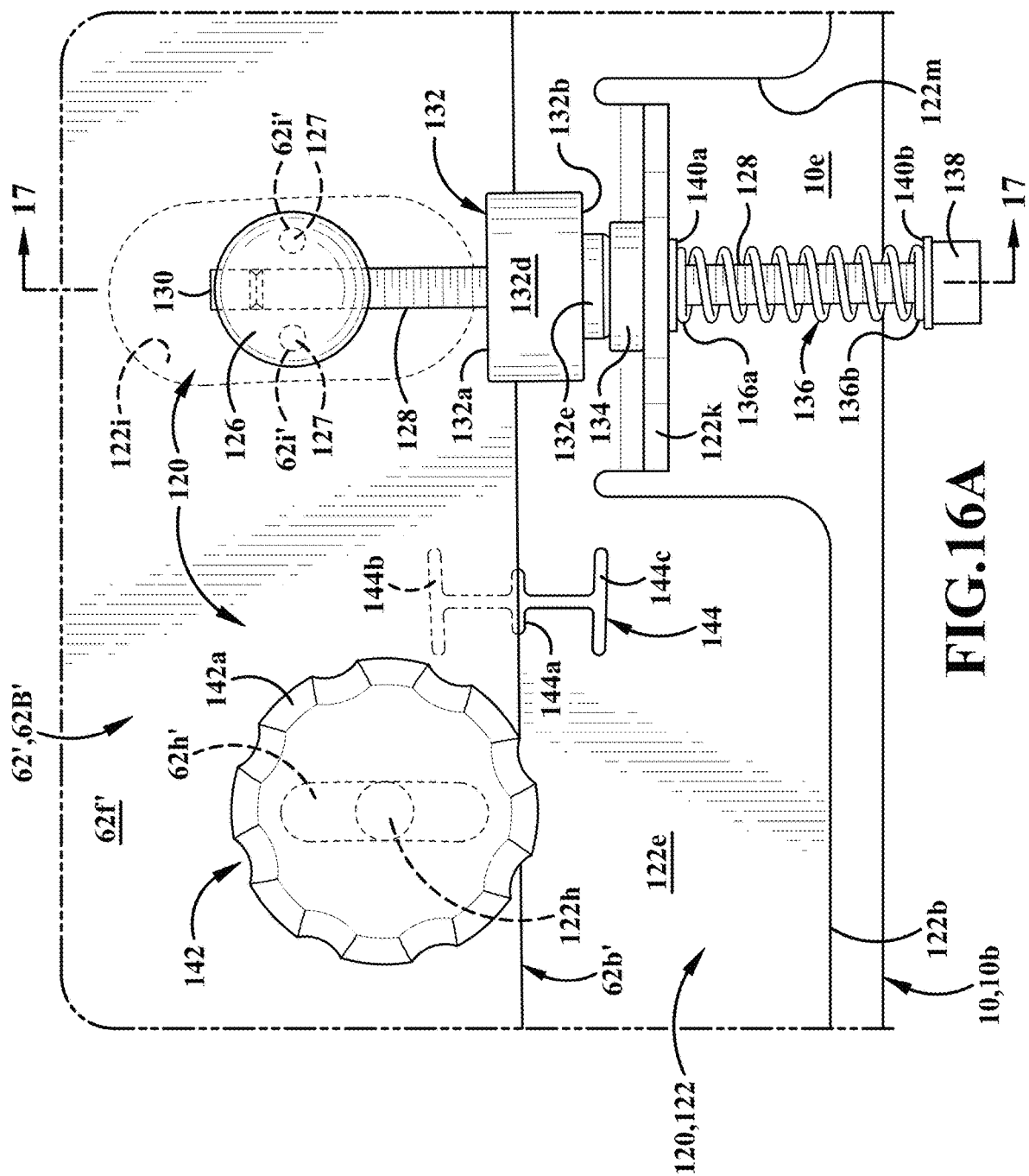

Still referring to frame 62', frame 62' also defines a pivot opening 62g' and a locking slot 62h'. As best seen in FIG. 16, pivot opening 62g' extends entirely through frame 62' between the outer surface 62e' and the inner surface 62f'; the outer surface 62e' and the inner surface 62f' are in communication with one another at the pivot opening 62g'. It should be noted that pivot opening 62g' is also closer to the second end 62b' of frame 62'. As best seen in FIG. 16A, locking slot 62h' also extends entirely through frame 62' between the outer surface 62e' and the inner surface 62f'; the outer surface 62e' and the inner surface 62f' are in communication with one another at the locking slot 62h'. It should be noted that locking slot 62h' is also closer to the second end 62b' of frame 62' and opposite to the pivot opening 62g' relative to the second axis of the frame 62'. Such use and purpose of pivot opening 62g' and locking slot 62h' are discussed in greater detail below.

Micro-adjuster assembly 120 includes a base plate 122. As best seen FIG. 15, base plate 122 includes a first end 122a, a second end 122b that is opposite to the first end 62a', and a first axis defined therebetween. Base plate 122 also includes a first side 122c, a second side 122d that is opposite to the first side 122c, and a second axis defined therebetween which is orthogonal to the first axis of base plate 122. Base plate 122 also includes a top surface 122e, an bottom surface 122f that is opposite to the top surface 122e, and a third axis defined therebetween which is orthogonal to the first axis of base plate 122.

Still referring to base plate 122, base plate 122 also includes a pivot post 122g and a locking post 122h. As best seen in FIG. 16, pivot post 122g extends upwardly from the top surface 122e of the base plate 122. It should be noted that pivot post 122g is also closer to the second end 122b of base plate 122. As best seen in FIG. 16A, locking post 122h also extends upwardly from the top surface 122e of the base plate 122. It should be noted that locking post 122h is also closer to the second end 122b of base plate 122 and opposite to the pivot post 122g relative to the second axis of the base plate 122. Upon assembly with frame 62', the pivot post 122g extends through the pivot opening 62g' of the frame 62', and locking post 122h extends through the locking slot 62h' of frame 62'. Such use and purpose of the pivot post 122g and locking post 122h are discussed in greater detail below.

Base plate 122 also defines a slot 122i. As best seen in FIG. 16A, slot 122i extends entirely through base plate 122 between the top surface 122e and the bottom surface 122f; the top surface 122e and the bottom surface 122f are in communication with one another at the slot 122i. It should be noted that slot 122i is also closer to the second end 122b of base plate 122 and opposite to the pivot post 122g relative to the second axis of the base plate 122. In the present disclosure, the locking post 122h is defined between the pivot post 122g and the slot 122i relative to the second axis of base plate 122. Such use and purpose of the slot 122i are discussed in greater detail below.

Still referring to base plate 122, base plate 122 may define a front notch. In this embodiment, front notch may extends inwardly from the first end 122a towards the second end 122b and is defined between the first side 122c and the second side 122d. The front notch may be configured to receive and house a portion of a tubular member of a vacuum system that is engaged with the frame 62' of the fence 60'. In the present disclosure embodiment, front notch is omitted from base plate 122 when a tubular member of a vacuum system is omitted from the fence 60'.

Figure 17:
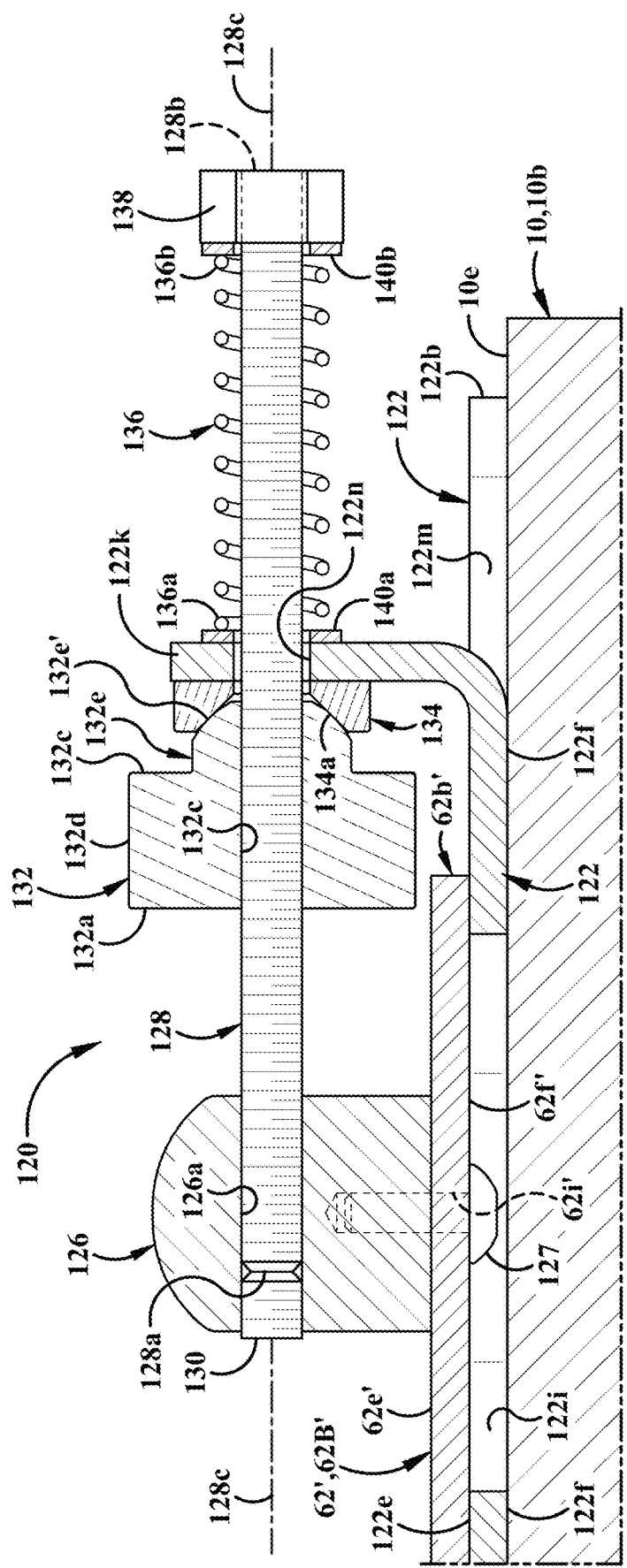
FIG. 17 (FIG. 17) is a sectional view of a portion of the fence and micro-adjuster assembly shown in FIG. 15.

Still referring to base plate 122, base plate 122 also includes a vertical wall 122k. As best seen in FIGS. 15 and 17, vertical wall 122k is bent upwardly from an internal wall of base plate 122 and is positioned above the top surface 122e. It should be noted that vertical wall 122k includes a portion of the second end 122b of base plate 122 that is positioned vertically above the top surface 122e and the remaining second end 122b of base plate 122. It should also be noted that vertical wall 122k includes a portion of top surface 122e and a portion of the bottom surface 122f that is positioned vertically above remaining top surface 122e and bottom surface 122f. Due to such construction of base plate 122, base plate 122 also defines a rear cutout 122m in the second end 122b of the base plate 122. Still referring to vertical wall 122k, vertical wall 122k also defines an aperture 122n that extends entirely through the vertical wall 122k between the top surface 122e and the bottom surface 122f (see FIG. 17); the top surface 122e and the bottom surface 122f are in communication with one another at the aperture 122n. Such use and purpose of vertical wall 122k and aperture 122n are discussed in greater detail below.

Micro-adjuster assembly 120 also includes a pivot mechanism 124 that operably engages frame 62' and base plate 122 with one another. As best seen in FIGS. 15-16, pivot mechanism 124 pivotably engages the frame 62' and the base plate 122 with one another at the pivot opening 62g' of the frame 62' when the pivot mechanism 124 threadably engages with pivot post 122g of the base plate 122. Particularly, a nut washer 124a of pivot mechanism 124 threadably engages with the pivot post 122g to pivotably engage the frame 62' and the base 122 with one another. Pivot mechanism 124 also includes a nylon washer 124b that is positioned between the nut washer 124a and the second major wall 62B' of frame 62' to allow a woodworker to easily pivot the frame 62'. Upon adjustment, the frame 62' pivots about a pivot axis 124c defined along the length of the pivot post 122 for setting fence 60' to different cutting distance relative to the router bit 84 and/or the base plate 122. Such adjustment of frame 62' with micro-adjuster assembly 120 is discussed in further detail below.

Micro-adjuster assembly 120 also includes a post 126 that operably engages with frame 62'. As best seen in FIG. 17, post 126 operably engages with the frame 62' at the pair of post openings 62i' by a pair of fasteners 127 and is positioned above the slot 122i of base plate 122. Post 126 also defines a threaded passageway 126a that extends along an axis that is perpendicular to the length of post 126; such use and purpose of threaded passageway 126a is discussed in greater detail below. It should be noted that post 126 is fixed to the frame 62' such that the post 126 is stationary during adjustment operations performed on the micro-adjuster assembly by a woodworker.

Micro-adjuster assembly 120 also includes a threaded shaft 128 that threadedly engages with post 126. As best seen in FIG. 17, threaded shaft 128 includes a first end 128a that threadably engages with the threaded passageway 126a of post 126, a second end 128b that is longitudinally opposite to the first end 128a and is spaced apart from the post 126, and a rotational axis 128c extending between the first end 128a and the second end 128b. The first end 128a of the threaded shaft 128 is also maintained inside of the post 126 by a set screw 130 that threadeably engages with the threaded passageway 126a of post 126 and directly abuts the first end 128a of threaded shaft 128 (see FIG. 17). In the present disclosure, the set screw 130 acts a stop to prevent the threaded shaft 128 from extending entirely through the post 126 when the threaded shaft 128 is adjusted by a woodworker, which is discussed in greater detail below.

Micro-adjuster assembly 120 also includes an adjustment knob 132 that threadably engages with the threaded shaft 128. As best seen in FIG. 17, adjustment knob 132 includes a first end 132a that faces the post 126, a second end 132b that is opposite to the first end 132a and faces the vertical wall 122k of base plate 122, and a lengthwise axis extending between the first end 132a and the second end 132b. Adjustment knob 132 also defines a threaded passage 132c that extends entirely through the adjustment knob 132 along the length of said adjustment knob 132 between the first end 132a and the second end 132b. In operation, and as discussed in greater detail below, the threaded passage 132c enables the threaded shaft 128 to threadably engage with the adjustment knob 132 in order to linear move the adjustment knob 132 to adjust the position of the frame 62' relative to the router bit 84 and/or the base plate 122. Adjustment knob 132 may also defining a grip 132d that is positioned external to the threaded passage 132c and extends circumferentially about the adjustment knob 132. Adjustment knob 132 also includes an extension 132e that extends longitudinally from the second end 132b. As best seen in FIG. 17, the extension 132e also defines an engagement surface 132e'. In the present disclosure, the engagement surface 132e' has a curvilinear or rounded shape when viewed from a sectional view (see FIG. 17); such use of a curvilinear or rounded cross-sectional shape to define extension 132e is discussed in greater detail below. In other exemplary embodiments, an engagement surface of an extension mentioned herein may define any suitable shape based on the implementation of extension 132e.

Micro-adjuster assembly 120 also includes a concave washer 134. As best seen in FIG. 17, concave washer 134 is installed onto the threaded shaft 128 and is positioned between the vertical wall 122k and the adjustment knob 132, particularly the extension 132e. Upon assembly, a portion of the extension 132e operably engages inside of a countersunk opening 134a defined in the concave washer 134. The shape of the countersunk opening 134a defined in the concave washer 134 is curvilinear and/or rounded; as such, the shapes of the extension 132e and the countersunk opening 134a of the concave washer 134 match one another. Such complementary shapes allows the adjustment knob 132 to pivot inside of the concave washer 134 when the fence 60' pivots based on adjustments made by the woodworker when using the micro-adjuster assembly 120.

Micro-adjuster assembly 120 also includes a spring 136. As best seen in FIG. 17, the spring 136 operably engages with the vertical wall 122k of the base plate 122 and with a lock nut 138. In the present disclosure, the spring 136 surrounds a portion of the threaded shaft 128 that is positioned behind the vertical wall 122k and the lock nut 138. The lock nut 138 is also threadably engaged with the threaded shaft 128 at the end that opposes the end threadeably engaged with the post 126. Once assembled, the lock nut 138 acts as a retaining mechanism or stop in order for the spring 136 to continuously apply a biasing force on the base plate 122. Such biasing force applied by the spring 36 prevents the woodworker from manually pushing or pulling the base plate 122 when adjusting the frame 62' as well as removes the backlash when adjusting the frame 62' with the micro-adjuster assembly 120.

Micro-adjuster assembly 120 may also include a pair of flat washers 140a, 140b. As best seen in FIG. 17, a first flat washer 140a is positioned between the vertical wall 122k and the first end 136a of spring 136 to prevent the spring 136 from entering into the aperture 122n defined in the vertical wall 122k during adjustment operations. Additionally, a second flat washer 140b is positioned between the vertical wall 122k and the first end 136a of spring 136 to prevent the spring 136 from entering into the aperture 122n defined in the vertical wall 122k during adjustment operations Micro-adjuster assembly 120 also includes a locking mechanism 142 that releasably engages the frame 62' and the base plate 122 with one another at a location that spaced apart from the pivot mechanism 124. As best seen in FIG. 16A, locking mechanism 142 includes a locking handle 142a that threadably engages with the locking post 122h which passes through the locking slot 62h' of the frame 62'. Upon assembly, locking handle 142a releasably locks the frame 62' and the base plate 122 with one another. As discussed in greater detail below, the woodworker may tighten the locking handle 142a with the locking post 122h to clamp and secure the frame 62' and the base plate 122 with one another to maintain the frame 62' at a desired angle relative to the base plate 122 for cutting operation.

Micro-adjuster assembly 120 also includes measurement indicia 144. As best seen in FIG. 16A, the measurement indicia 144 is located on the base plate 122, particularly the top surface 122e of the base plate 122. The measurement indicia 144 includes a center of travel marker or starting marker 144a that indicates that the second end 62b' of the frame 62' is at a first or starting distance (denoted "D1" in FIG. 16) that is measured relative to the base plate 122 or the router bit 84. The measurement indicia 144 also includes a first terminal marker 144b and a second terminal marker 144c opposite to the first terminal marker 144b. With respect to the first terminal marker 144b, marker 144b indicates that the fence 60' is set at a first terminal distance (denoted "D2" in FIG. 18A) that is measured relative to the base plate 122 or the router bit 84. Similarly, with respect to the second terminal marker 144c, marker 144c indicates that the fence 60' is set at a second terminal distance that is measured relative to the base plate 122 or the router bit 84 (denoted as "D3" in FIG. 18B). In operation, the woodworker uses the rearmost end or edge of the fence 60' (i.e., second end 62b') to set the desired distance at one of the starting marker 144a, the first terminal marker 144b, or the second terminal marker 144c.

It should be noted that the woodworker may also set the second end 62b' of fence 60' at other suitable locations based on the cutting or routing operations. In one example, woodworker may set the second end 62b' of the frame 62' at a location between the starting marker 144a and the first terminal marker 144b. In another example, woodworker may set the second end 62b' of the frame 62' at a location between the starting marker 144a and the second terminal marker 144c. While not illustrated herein, smaller or incremental markers may be placed between the starting marker 144a and the first terminal marker 144b to provide more precise and accurate fine adjustments when the woodworker is adjusting the frame 62' in the first adjustment direction. Similarly, smaller or incremental markers may be placed between the starting marker 144a and the second terminal marker 144c to provide more precise and accurate adjustments when the woodworker is adjusting the frame 62' in the second adjustment direction.

As mentioned previously, the first terminal marker 144b and the second terminal marker 144c each set the frame 62' to a specific distance measured relative to the starting marker 144a. In one example, the first terminal distance measured between the starting marker 144a and the first terminal marker 144b is approximately 0.22 inches. In the same example, the second terminal distance measured between the starting marker 144a and the second terminal marker 144c is approximately 0.22 inches. With this versatility, a woodworker may perform fine adjustments in a first direction (i.e., moving second end 62b' of fence 60' from the starting marker 144a to the first terminal marker 144b) where the woodworker wants incrementally move the fence 60' closer to the router bit 84. Similarly, a woodworker may also perform fine adjustments in a second opposing direction (i.e., moving second end 62b' of fence 60' from the starting marker 144a to the second terminal marker 144c) where the woodworker wants incrementally move the fence 60' away from the router bit 84.

Having now discussed the components and features of the frame 62' and the micro-adjuster assembly 120, a method of setting a desired cutting distance between the fence 60' and the router bit 84 with the micro-adjuster assembly 120 is discussed in greater detail below.

Prior to setting a desired cutting distance between the fence 60' and the router bit 84 with the micro-adjuster assembly 120, the woodworker releasably secures the fence 60' and the micro-adjuster assembly 120 with the bench 10 by the clamping handles 64. Particularly, the woodworker may collectively slide the fence 60' and the micro-adjuster assembly 120 along the bench 10 until the fence 60' and the micro-adjuster assembly 120 reaches a desired location on the bench 10. Such desired location may be based on the size, shape, or configuration of the various types of workpiece that the woodworker is cutting while using the fence 60' and the micro-adjuster assembly 120. Once the desired location is reached, the clamping handles 64 are tightened to the base plate 122 (at the clamping openings 122p) and the bench 10 (at the top pair of slots 10n) until the base plate 122 is secured to the bench 10.

Once secured to the bench 10, the woodworker may then use the micro-adjuster assembly 120 to set the desired cutting distance for the frame 62'. Prior to setting such cutting distance, the frame 62' is set at the starting marker 144a based on the placement of the second end 62b' of the frame 62'. With this configuration, frame 62' is set at the first distance "D1" measured between the router bit 84 when referencing to the starting marker 144a.

Figure 18A:
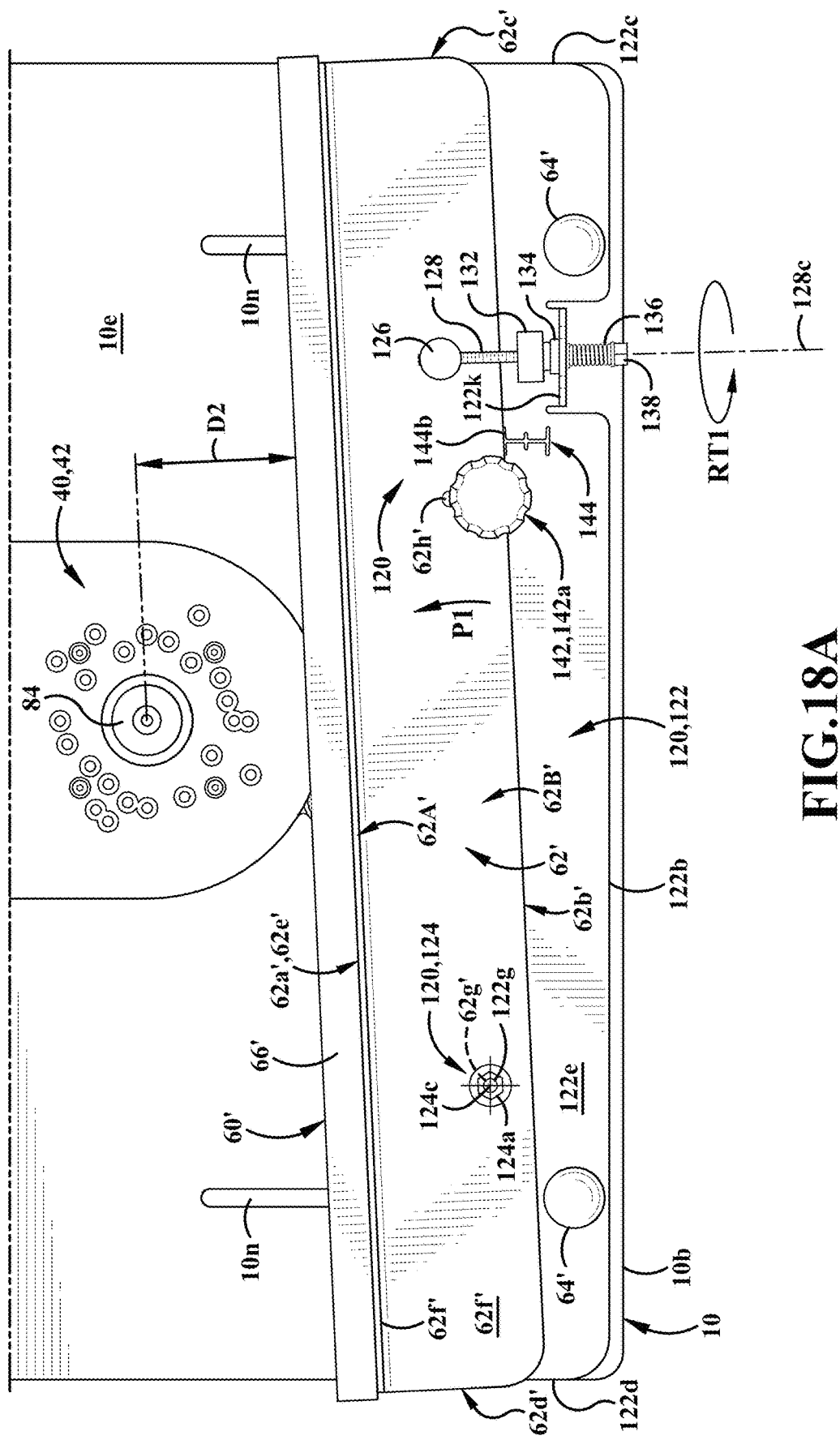
FIG. 18A (FIG. 18A) is an operational view of the portable router table, wherein the micro-adjuster assembly translates the fence in a first direction from the starting position to a first terminal position and measures at a second distance from the router bit.
Figure 18B:
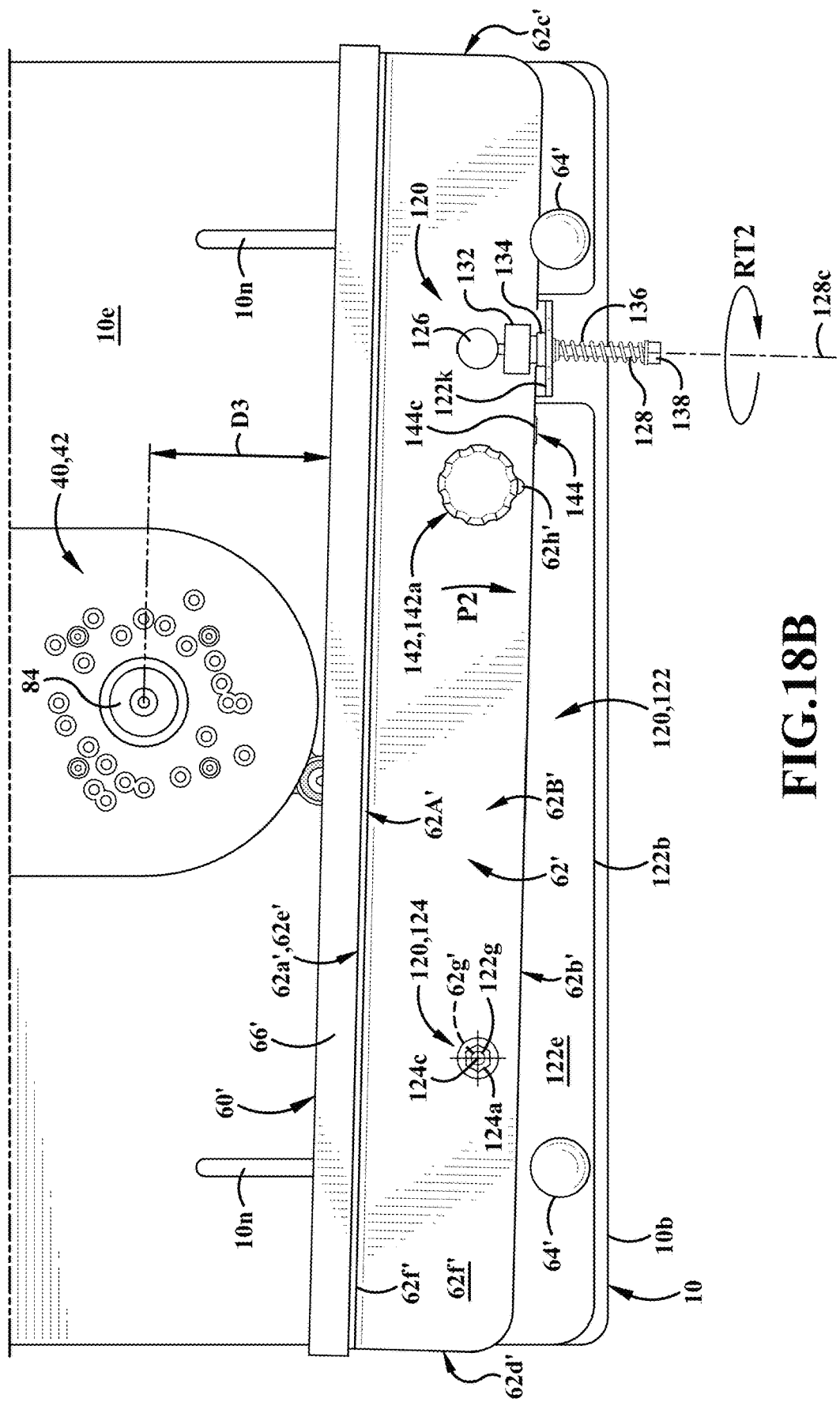
FIG. 18B (FIG. 18B) is an operational view of the portable router table, wherein the micro-adjuster assembly translates the fence in a second direction from the starting position to a second terminal position and measures at a third distance from the router bit.

To initiate adjustment, the woodworker rotates the adjustment knob 132 in either a first rotational direction or a second rotational direction to move the fence 60'; such rotation of the adjustment knob 132 is denoted by an arrow labeled "RT1" in FIG. 18A. For illustrative purposes, the adjustment knob 132 is being rotated in the first rotational direction in FIG. 18A to show the functionality of the micro-adjuster assembly 120. The rotation of the adjustment knob 132 in the second rotational direction is substantially similar but performed in the opposing direction; such rotation of the adjustment knob 132 in the second rotational direction is denoted by an arrow labeled "RT2" in FIG. 18B.

As the adjustment knob 132 is rotated in the first rotational direction, the threaded shaft 128 is rotated by the adjustment knob 132 causing the threaded shaft 128 to linearly move in a first linear direction. With such linear movement, the threaded shaft 128 presses against the post 126 in the first direction causing the frame 62' to move in the first direction due to the engagement between the frame 62' and the post 126. As the frame 62' is being moved by the threaded shaft 128, the frame 62' also pivots about the connector 124a of pivot mechanism 124 at a distance away from the post 126 for setting the desired cutting distance for woodworker. As the frame 62' is being moved by the threaded shaft 128, the spring 136 also compresses due to the threaded shaft 128 being moved linearly away from the vertical wall 122k.

As the frame 62' is pivoting about the connector 124a, the threaded shaft 128 also moves inside of the aperture 122n defined in the vertical wall 122k. As such, the aperture 122n is wide enough so that the vertical wall 122k is free from impeding or hindering movement of the threaded shaft 128 as the threaded shaft 128 pivots with the frame 62'. It should also be noted that the interaction between the extension 132e and the concave washer 134 enables the adjustment knob 132 to pivot on the concave washer 134 with ease due to the matching shapes of the extension 132e and the rounded and/or concave opening of the concave washer 134.

Once the woodworker reaches the desired cutting distance, the woodworker ceases actuation of the adjustment knob 132 to cease all movement between the frame 62' and the micro-adjuster assembly 120. Such actuation of the adjustment knob 132 may conclude when the second end 62b' of the frame 62 reaches a desired marker, such as the first terminal marker 144b or a marker located between the starting marker 144a and the first terminal marker 144b, that matches with the desired cutting distance. Once the desired cutting distance is reached, the woodworker may then tighten the locking mechanism 142 to the frame 62' and the base plate 122 to maintain the desired cutting distance. Particularly, the woodworker screws or tightens the locking handle 142a with the locking post 122h until the frame 62' and the base plate 122 are releasably secured with one another and are free from shifting or sliding away from the desired cutting distance. At this stage, the woodworker may then introduce a workpiece to router table 1 once the fine adjustments are complete.

In the present disclosure, the first distance "D1", the second distance "D2", the third distance "D3" provide the fence 60' at different distance relative to the router bit 84. In the present disclosure, when the second end 62b' of fence 60' is aligned with the first terminal marker 144b (see FIG. 18A), the second distance "D2" is set and is less than the first distance "D1" and the third distance "D3". Additionally, when the second end 62b' of fence 60' is aligned with the second terminal marker 144c (see FIG. 18B), the third distance "D3" is greater than the first distance "D1".

It should be noted that woodworker may repeat the adjustment process one or more times depending on the types of workpiece that the woodworker will be cutting with the router table 1.

Figure 19:
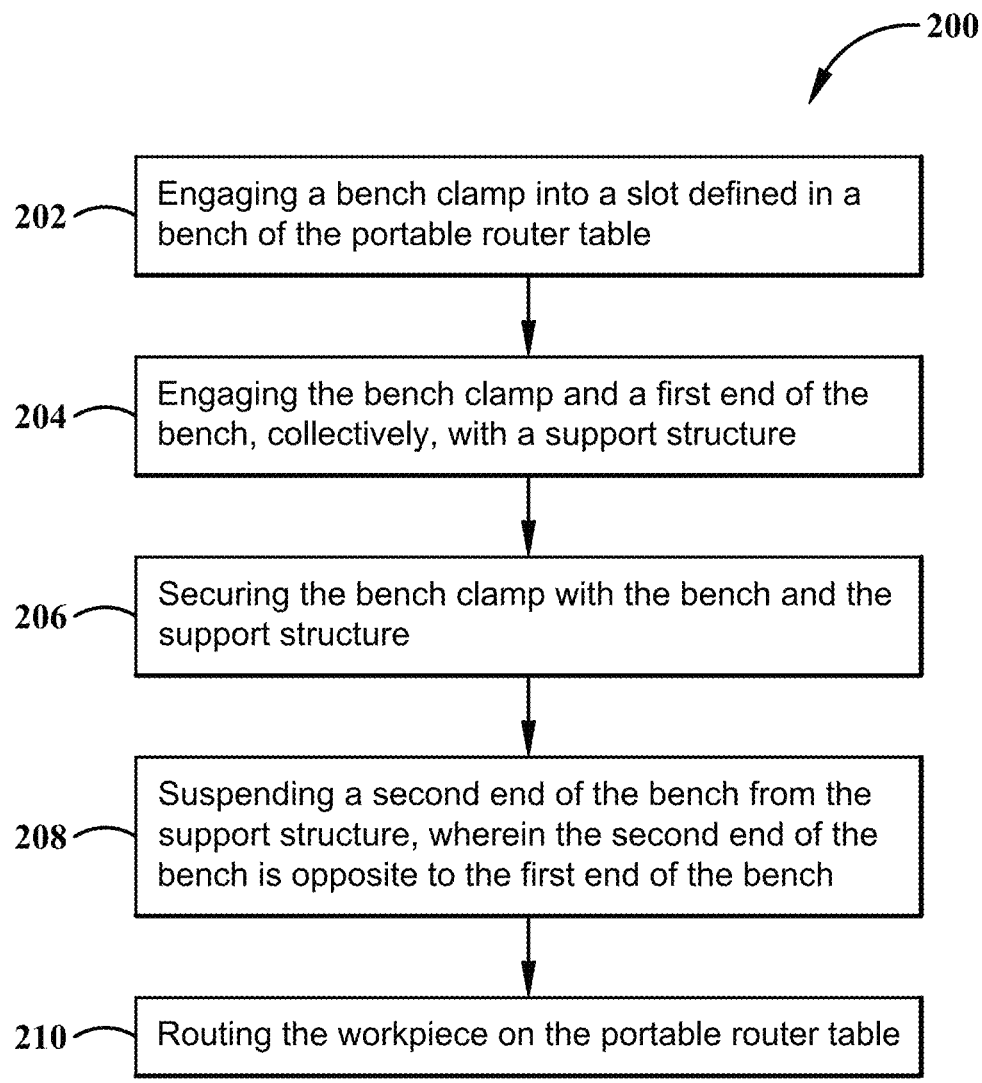
FIG. 19 (FIG. 19) is an exemplary method flowchart.

FIG. 19 is a method 200 of cutting a workpiece on a portable router table. An initial step 202 of method 200 includes engaging a bench clamp into a slot defined in a bench of the portable router table. Another step 204 of method 200 includes engaging the bench clamp and a first end of the bench, collectively, with a support structure. Another step 206 of method 200 includes securing the bench clamp with the bench and the support structure. Another step 208 of method 200 includes suspending a second end of the bench from the support structure, wherein the second end of the bench is opposite to the first end of the bench. Another step 210 of method 200 includes routing the workpiece on the portable router table.

In other exemplary embodiments, additional or optional steps may be included in method 200 for cutting a workpiece with a portable router table. In one exemplary embodiment, method 200 may further include steps of resting a portion of a bottom surface of the bench on the support structure; and positioning the bench above the support structure. In another exemplary embodiment, method 200 may further include steps of resting a portion of a top surface of the bench on the support structure; and positioning the bench below the support structure. In another exemplary embodiment, method 200 may further include steps of engaging a second bench clamp into a second slot defined in the bench, wherein the second slot is transversely opposite to the slot; engaging the second bench clamp and the first end of the bench, collectively, with the support structure; and securing the second bench clamp with the bench and the support structure. In another exemplary embodiment, method 200 may further include steps of disengaging the bench clamp from the bench and the support structure; engaging the bench clamp to a foot of a leg of the portable router table; engaging the bench clamp and the foot, collectively, with the support structure; and securing the bench clamp with the foot and the support structure. In another exemplary embodiment, method 200 may further include steps of positioning a router base of the portable router table at a first cutting orientation or at a second cutting orientation relative to the bench; wherein when the router base is in the first cutting orientation, the router base is engaged with the bench; and wherein when the router base is in the second cutting orientation, the router base is spaced apart and remote from the bench.

Figure 20:
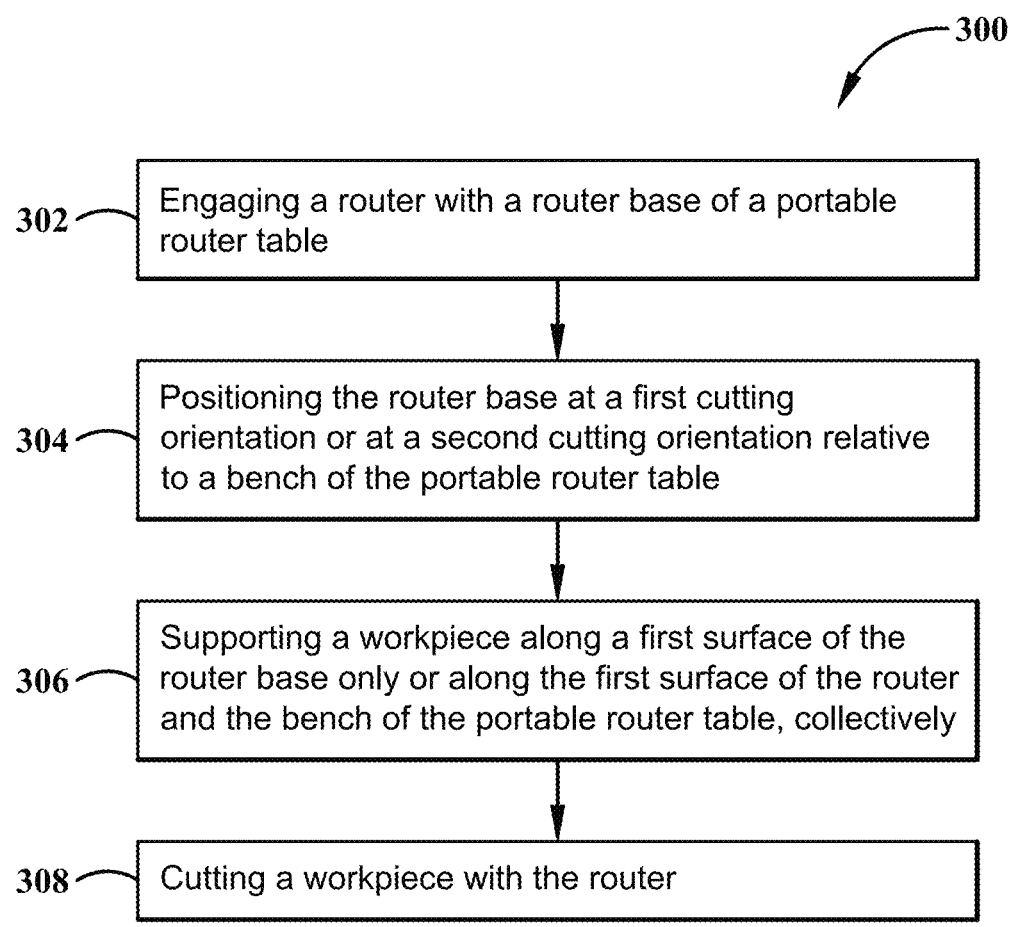
FIG. 20 (FIG. 20) is an exemplary method flowchart.

FIG. 20 is a method 300 of cutting a workpiece. An initial step 302 of method 300 includes engaging a router with a router base of a portable router table. Another step 304 of method 300 includes positioning the router base at a first cutting orientation or at a second cutting orientation relative to a bench of the portable router table of the portable router table. Another step 306 of method 300 includes supporting a workpiece along a first surface of the router base only or along the first surface of the router and the bench of the portable router table, collectively. Another step 308 of method 300 includes cutting a workpiece with the router.

In other exemplary embodiments, additional or optional steps may be included in method 300 for cutting a workpiece with a portable router table. In one exemplary embodiment, method 300 may further include steps of engaging the router base with the bench of the portable router table when the router base is in the first cutting orientation; and supporting the workpiece by the router base and the bench of the portable router table when the router base is in the first cutting orientation. In another exemplary embodiment, method 300 may further include steps of separating the router base from the bench of the portable router table when the router base is in the second cutting orientation; and supporting the workpiece by the router base when the router base is in the second cutting orientation. In another exemplary embodiment, method 300 may further include steps of accessing a handle of the router base through a front opening defined in the bench of the router base; and removing the router base from the bench, by the handle, from the first cutting orientation to the second cutting orientation. In another exemplary embodiment, method 300 may further a include step of seating the router base inside of a seating recess defined in the bench when the router base is in the first cutting orientation. In another exemplary embodiment, method 300 may further include a step of securing the router base with a retaining member of the portable router table in the first cutting orientation. In another exemplary embodiment, method 300 may further include steps of disengaging the router from the router base, wherein the router is arranged with a first set of apertures defined in the router base; aligning a second router with a second set of apertures defined in the router base, wherein the second router is different than the router, and wherein the second set of apertures is different than the first set of apertures; and engaging the second router with the router base.

Figure 21:
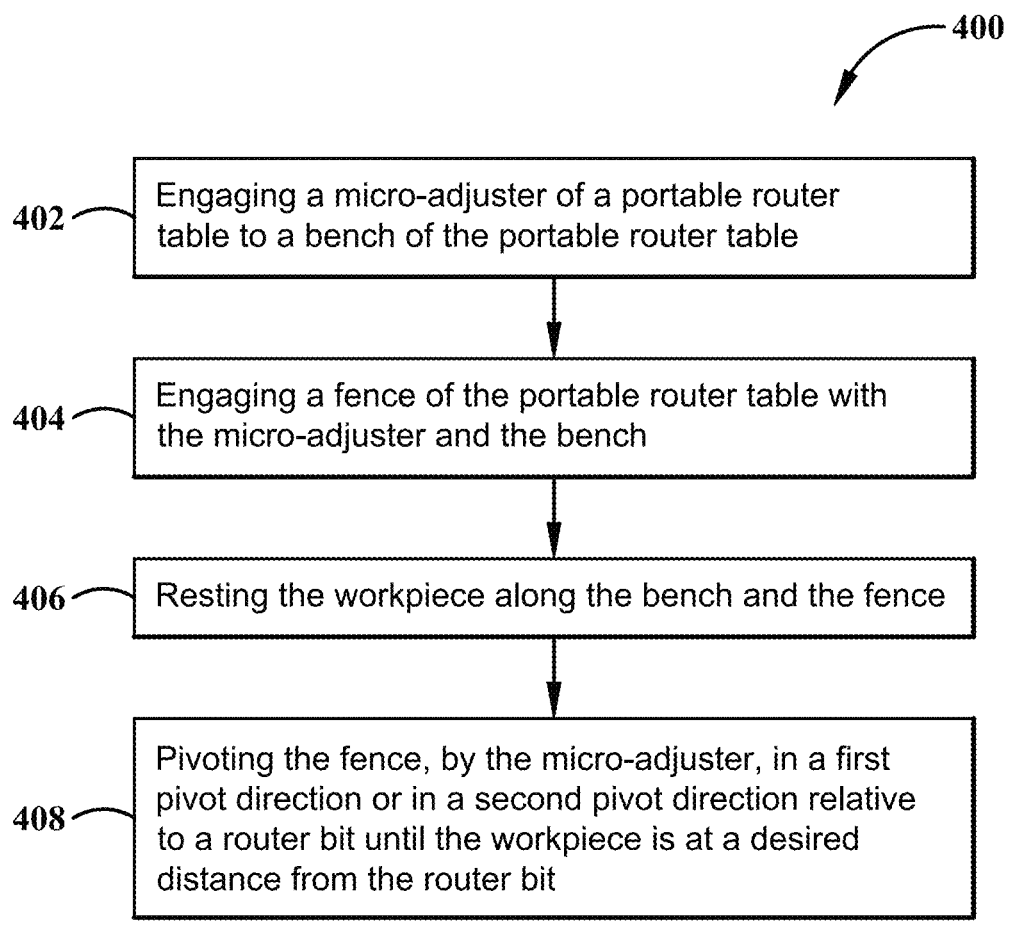
FIG. 21 (FIG. 21) is an exemplary method flowchart.

FIG. 21 is a method 400 for adjusting a workpiece relative to a router. An initial step 402 of method 400 includes engaging a micro-adjuster of a portable router table to a bench of the portable router table. Another step 404 of method 400 includes engaging a fence of the portable router table with the micro-adjuster and the bench. Another step 406 of method 400 includes resting the workpiece along the bench and the fence. Another step 408 of method 400 includes pivoting the fence, by the micro-adjuster, in a first pivot direction or in a second pivot direction relative to a router bit until the workpiece is at a desired distance from the router bit.

In other exemplary embodiments, additional or optional steps may be included in method 400 for cutting a workpiece with a portable router table. In one exemplary embodiment, method 400 may further include steps of engaging a post of the micro-adjuster with the fence; engaging a shaft of the micro-adjuster with the fence and a base plate of the micro-adjuster; engaging an adjustment knob of the micro-adjuster with the shaft and the base plate. In another exemplary embodiment, method 400 may further include that the step of pivoting the fence further comprises: rotating an adjustment knob of the micro-adjuster a first rotational direction or in a second rotational direction; moving the shaft in a first linear direction or in a second linear direction; moving the post and the fence, collectively, in the first pivot direction towards the router bit or in the second pivot direction away from the router bit. In another exemplary embodiment, method 400 may further include a step of positioning the micro-adjuster between the fence and the bench. In another exemplary embodiment, method 400 may further include steps of aligning a rear end of a frame of the fence with a starting marker of a measurement indicia that is on a base plate of the micro-adjuster; and defining the fence at a first distance measured relative to the router bit. In another exemplary embodiment, method 400 may further include steps of aligning the rear end of the frame with a first terminal marker of the measurement indicia; defining the fence at a second distance measured relative to the router bit that is less than the first distance. In another exemplary embodiment, method 400 may further include steps of aligning the rear end of the frame with a second terminal marker of the measurement indicia; and defining the fence at a third distance measured relative to the router bit that is greater than the first distance and the second distance.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any flowchart and/or block diagrams in the Figures illustrate some exemplary architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present disclosure.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments. Furthermore, the use of any and all examples or exemplary language ("e.g.," "such as," or the like) is intended merely to better illustrate or illuminate the embodiments and does not pose a limitation on the scope of that or those embodiments. No language in this specification should be construed as indicating any unclaimed element as essential to the practice of the disclosed embodiment.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element or "another" element, that does not preclude there being more than one of the additional element or the another element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein. Further, recitation of ranges of values herein are not intended to be limiting, referring instead individually to any and all values falling within that range, unless otherwise indicated herein, and each separate value within such range is incorporated into the specification as if it were individually recited herein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, or in the context of those sections, this term has been included as required by the formatting requirements of word document submissions (i.e., docx submissions) pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A portable router table, comprising:
   a top surface of a bench that is adapted to support at least one workpiece;
   a bottom surface of the bench that is spaced apart from the top surface;
   a seating recess defined in the bench and is accessible from the top surface and the bottom surface; and
   a front opening defined in the bench; and
   a router base having a plate removably engageable with the bench and is adapted to support a router, a router bit opening defined in the plate for receiving a router bit of the router, and a handle operably engaged with the plate opposite to the router bit opening;
   wherein when the router base is provided in a first cutting orientation, the router base is engaged with the bench and is seated inside of the seating recess; and
   wherein when the router base is provided in a second cutting orientation, the router base is spaced apart and remote from the bench to support the router for routing at least another workpiece that is free from being supported by the bench; and
   wherein the front opening provides access to the seating recess and the handle of the router base when the router base is provided in the first cutting orientation.

2. The portable router table of claim 1, wherein when the router base is provided in the first cutting orientation, the router base and the top surface of the bench are even with one another to form a continuous surface; and
   wherein when the router base is provided in the second cutting orientation, the router base and the top surface of the bench are free from forming a continuous surface.

3. The portable router table of claim 1, wherein the plate comprises:
   a first surface adapted to rest on the at least one workpiece;
   a second surface opposite to the first surface and is adapted to contact the router and the handle; and
   a central opening defined in the plate and extending between the first surface and the second surface;
   wherein a router bit of the router is adapted to pass through the central opening.

4. The portable router table of claim 1, wherein when the router base is provided in the first cutting orientation, the router bit extends upwardly from the top surface of the bench; and
   wherein when the router base is provided in the first cutting orientation, the motor is positioned below the bench and the at least one workpiece.

5. The portable router table of claim 1, wherein when the router base is provided in the second cutting orientation, a motor of the router is positioned above the at least one workpiece and remote from the bench.

6. The portable router table of claim 3, wherein when the router base is provided in the first cutting orientation, the first surface of the plate and the top surface of the bench are even with one another to form a continuous surface; and
   wherein when the router base is provided in the first cutting orientation, the second surface rests inside of the bench.

7. The portable router table of claim 3, wherein when the router base is provided in the first cutting orientation, the handle of the router base extends downwardly and accessible below the bottom surface of the bench.

8. The portable router table of claim 1, further comprising:
   an internal lateral wall;
   an internal base wall positioned below the internal lateral wall; and
   wherein the seating recess is collectively defined by the internal lateral wall and the internal base wall;
   wherein the router base is held by the internal lateral wall and the internal base wall inside of the seating recess when in the first cutting orientation.

9. The portable router table of claim 8, further comprising:
   a retaining member operably engaged with the bench;
   wherein the retaining member is partially seated inside of the seating recess and directly abuts a peripheral wall of the plate of the router base to frictionally fit the router base with the bench.

10. The portable router table of claim 9, further comprising:
    a cavity defined by the internal lateral wall and the internal base wall and is in communication with the seating recess;
    wherein the retaining member is partially seated inside of the cavity.

11. The portable router table of claim 9, wherein when the router base is provided in the first cutting orientation, the retaining member is deformed to frictionally fit the router base with the bench; and
    wherein when the router base is provided in the second cutting orientation, the retaining member is free from being deformed and free from engaging with the router base.

* * * * *